United States Patent
Kakutani

(10) Patent No.: US 6,439,682 B1
(45) Date of Patent: Aug. 27, 2002

(54) PRINTING METHOD, PRINTING APPARATUS, AND RECORDING MEDIUM

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/259,326

(22) Filed: Mar. 1, 1999

(30) Foreign Application Priority Data

Mar. 5, 1998 (JP) .......................................... 10-073426
Oct. 5, 1998 (JP) .......................................... 10-299175

(51) Int. Cl.[7] .............................................. G06F 15/00
(52) U.S. Cl. .......................... 347/15; 358/1.9; 358/298
(58) Field of Search ...................... 347/15, 43; 358/1.8, 358/1.9, 298

(56) References Cited

U.S. PATENT DOCUMENTS 5,795,082 A * 8/1998 Shimada et al. ........ 400/120.09
6,031,627 A * 2/2000 Kakutani .................... 358/1.9

FOREIGN PATENT DOCUMENTS

JP 10-157167 6/1998

* cited by examiner

Primary Examiner—John E. Barlow, Jr.
Assistant Examiner—Blaise Mouttet
(74) Attorney, Agent, or Firm—Oblon, Spivak, McClelland, Maier & Neustadt, P.C.

(57) ABSTRACT

In a printing apparatus that enables at least three different types of dots to be created in different ink weights by at least two different inks having an identical hue but different densities, the halftone processing is carried out in an appropriate sequence and according to an appropriate technique, which are determined by taking into account both the dispersibility of dots and the processing speed. The method of the present invention determines the on-off state of six different types of dots, which have different ink densities and ink weights, in the sequence of the large deep dot, the medium deep dot, the small deep dot, the large light dot, the medium light dot, and the small light dot. The dots created by an identical ink are subjected to the determination for the on-off state in a consecutive manner. A dither method that utilizes the recording ratio set for each type of dot according to the tone data is adopted in the determination for the on-off state of the dot. The method determines the on-off state of a target dot, based on a corrected recording ratio. The corrected recording ratio is obtained by adding the recording ratios of all the dots previously subjected to the determination for the on-off state to the recording ratio of the target dot. For example, the sum of the recording ratios of the large deep dot, the medium deep dot, and the small deep dot and the recording ratio of the large light dot is used in the determination for the on-off state of the large light dot. This arrangement of the present invention effectively prevents the different types of dots, especially the dots created by the identical ink, from being created in an identical pixel in an overlapping manner. One modified structure determines the on-off state of the small light dot by an error diffusion method. This improves the picture quality of the resulting printed image.

24 Claims, 15 Drawing Sheets

Fig. 12

64dots

| | | | | | | | | | | | | | | | | |
|---|---|---|---|---|---|---|---|---|---|---|---|---|---|---|---|---|
| 1 | 177 | 58 | 170 | 70 | 186 | 79 | 161 | 94 | 171 | 16 | 164 | 24 | 158 | 227 | 6 | 133 | 157 |
| 255 | 109 | 212 | 42 | 242 | 5 | 223 | 48 | 209 | 67 | 248 | 81 | 234 | 132 | 56 | 120 | 253 |
| 123 | 33 | 127 | 181 | 83 | 155 | 105 | 140 | 30 | 150 | 119 | 182 | 40 | 89 | 220 | 163 | 44 |
| 219 | 91 | 237 | 22 | 121 | 198 | 61 | 188 | 111 | 215 | | 98 | 201 | 140 | 10 | 95 |
| 11 | 195 | 53 | 136 | 227 | 37 | 247 | 12 | 233 | 52 | 192 | 135 | 32 | 246 | 113 | 194 |
| 99 | 144 | 107 | 184 | 68 | 172 | 97 | 151 | 77 | 173 | 84 | 237 | 123 | 61 | 167 | 46 |
| 225 | 40 | 251 | 6 | 217 | 116 | 28 | 196 | 125 | 35 | 207 | 17 | 153 | 203 | 24 |
| 87 | 169 | 78 | 162 | 59 | 146 | 211 | 64 | 254 | 142 | 72 | 178 | 87 | 118 | 228 |
| 190 | 15 | 202 | 111 | 238 | 19 | 93 | 169 | 8 | 110 | 221 | 49 | 249 | 2 | 144 |
| 74 | 246 | 134 | 43 | 174 | 128 | 230 | 50 | 216 | 154 | 26 | 168 | 79 | 184 |
| 176 | 30 | 98 | 219 | 86 | 34 | 139 | 195 | 101 | 56 | 241 | 127 | 213 | 37 |
| 69 | 148 | 196 | 2 | 159 | 247 | 89 | 11 | 136 | 185 | 92 | 14 | 108 | 167 |
| 187 | 41 | 126 | 226 | 106 | 57 | 190 | 115 | 235 | 36 | 208 | 121 | 229 |
| 81 | 214 | 92 | 53 | 145 | 204 | 27 | 166 | 74 | 157 | 82 | 165 | 31 |
| 232 | 21 | 170 | 240 | 13 | 132 | 252 | 51 | 222 | 4 | 245 | 48 |
| 130 | 155 | 55 | 115 | 183 | 78 | 122 | 196 | 102 | 180 | 65 | 173 |
| 72 | 252 | 100 | 211 | 45 | 231 | 20 | 148 | 39 | 133 | 205 |
| 202 | 32 | 179 | 5 | 163 | 95 | 191 | 86 | 239 | 111 | 29 |
| 104 | 143 | 58 | 243 | 70 | 218 | 63 | 161 | 9 | 209 | 139 |
| 64 | 236 | 129 | 110 | 151 | 25 | 199 | 49 | 172 | 68 |
| 171 | 17 | 208 | 38 | 225 | 131 | 99 | 254 | 113 |
| 80 | 191 | 87 | 174 | 76 | 189 | 13 | 143 |
| 247 | 35 | 152 | 2 | 248 | 55 |
| 140 | 108 | 197 | 127 | 96 |
| 13 | 215 | 46 | 229 |
| 164 | 90 | 180 |
| 52 | 253 |
| 205 |

64dots

Fig. 14A
| 1 | 9 | 3 | 11 |
|---|---|---|----|
| 13 | 5 | 15 | 7 |
| 4 | 12 | 2 | 10 |
| 16 | 8 | 14 | 6 |
Fig. 14B
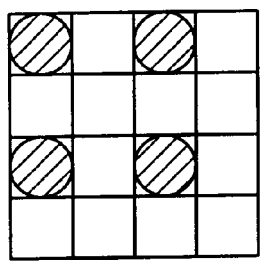
Fig. 14C
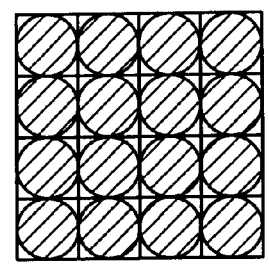
Fig. 14D
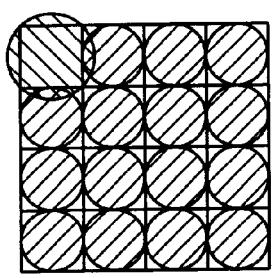
Fig. 14E
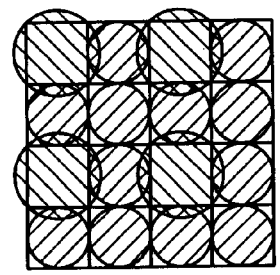
Fig. 14F
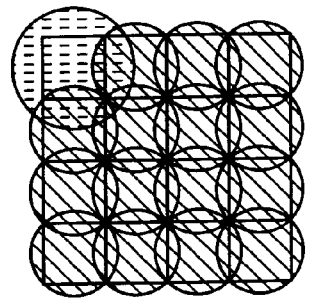
Fig. 14G
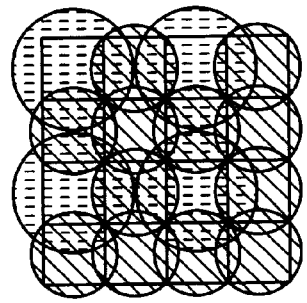

Fig. 16
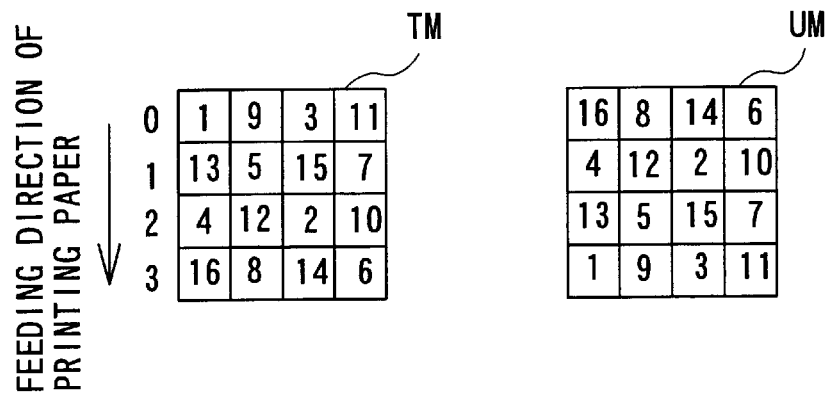
Fig. 17A  Fig. 17B
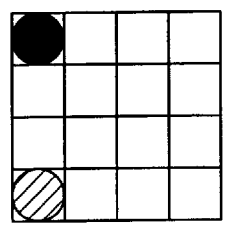 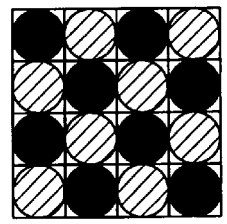
Fig. 18
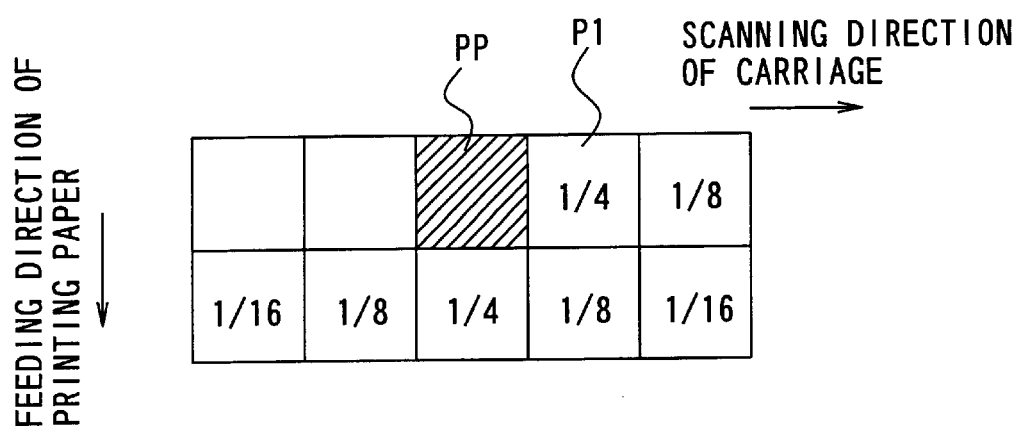

PRINTING METHOD, PRINTING APPARATUS, AND RECORDING MEDIUM

BACKGROUND OF THE INVENTION

1. Field of the Invention

The present invention relates to a printing method, which creates at least three different types of dots and thereby enables printing of a multi-tone image, as well as a printing apparatus to actualize the printing method. The invention also pertains to a recording medium on which a program for actualizing the printing method is recorded.

2. Description of the Related Art

An ink jet printer proposed as an output apparatus of the computer creates dots with inks of different colors spouted from a plurality of nozzles mounted on a head and thereby records a multi-color image. The ink jet printer has widely been used to print an image processed by the computer in a multi-color, multi-tone manner. In this printer, each pixel typically has only two tones, that is, the dot-on state and the dot-off state. An image is accordingly printed after the halftone processing, which is the image processing performed to enable the tone of the original image data to be expressed by the dispersibility of dots.

In order to enrich the tone expression, the recently proposed ink jet printer is a multi-valuing printer that enables the tone expression of each pixel in three or a greater number of values. One example of the multi-valuing printer varies the dot diameter and the ink density and thus enables three or a greater number of different densities for each dot. Another example of the multi-valuing printer creates a plurality of dots in each pixel in an overlapping manner to enable the multi-tone expression. In these printers, the halftone processing is required since the tone of the original image data can not be expressed sufficiently in each pixel unit.

Typical methods applicable for the halftone processing include the dither method and the error diffusion method. The dither method determines the on-off state of the respective dots based on the results of the comparison between a threshold value corresponding to each pixel read from a dither matrix and the tone value of the image data. The error diffusion method diffuses a density error arising due to the determination for the on-off state of the dot with respect to a certain pixel into peripheral pixels and corrects the tone data of these peripheral pixels. The error diffusion method then determines the on-off state of the respective dots based on the results of the comparison between the corrected tone data and a predetermined threshold value. The advantage of the dither method is the high-speed processing, whereas the advantage of the error diffusion method is the excellent picture quality.

In the multi-valuing printer that enables tone expression in three or a greater number of values, a plurality of different types of dots can be created for an identical hue. The halftone processing generally determines the on-off state of the respective dots individually. In order to enable the smooth expression of multiple tones and realize the printing of high picture quality, it is desirable to prevent the dots of the identical hue from being created in the same pixel in an overlapping manner. The technique of halftone processing that takes into account this point is, for example, described in JAPANESE PATENT LAID-OPEN GAZETTE No. 10-157167.

The proposed technique of halftone processing adopts the dither method in the following manner to determine the on-off state of the deep dot having a higher density and the light dot having a lower density. A recording ratio of the deep dot and a recording ratio of the light dot corresponding to the tone data of each pixel are read from a table provided in advance. The determination for the on-off state is carried out in the sequence of the deep dot and the light dot, based on the result of the comparison between a threshold value read from an identical dither matrix and the recording ratio. The result of the comparison between the threshold value and the sum of the recording ratio of the deep dot and the recording ratio of the light dot is used in the determination for the on-off state of the light dot. The light dot is set in the off state in the pixel where the deep dot has been set in the on state. This technique enables the deep dot and the light dot to be recorded in different pixels while maintaining the required recording ratios of the deep dot and the light dot.

There has been, however, little consideration on the sequence of making the dots subjected to the determination for the on-off state and the selection of the adequate method for the halftone processing in the multi-valuing printer that is provided with at least two inks having an identical hue but different densities and enables at least two different types of dots having different ink weights to be created. One example of the multi-valuing printer is provided with two inks of different densities, that is, the deep ink and the light ink, and enables at least two different types of dots having different ink weights to be created by each ink.

In order to realize the printing of high picture quality, it is desirable to create the dots of the identical hue in a sufficiently dispersing manner. The dots of the identical hue, however, often require different dispersibilities. The dots created by the inks of different densities are generally formed by separate heads. Creation of these dots in an identical pixel thus does not significantly affect the printing speed. Creation of the dots having different ink weights by an identical ink in an identical pixel, on the other hand, requires the head to be driven twice or more times for the same pixel, thereby significantly lowering the printing speed. The requirement for the sufficient dispersibility of the dots is thus especially high for the dots created by the identical ink.

An increase in number of different dots subjected to the determination for the on-off state in each pixel results in the longer time required for the halftone processing. Application of the dither method for the halftone processing does not ensure the high picture quality, while enabling the high-speed processing. The primary object of the multivaluing printer enriches the tone expression and realizes the printing of high picture quality. The deterioration of the picture quality is thus not a negligible problem in the multi-valuing printer. Application of the error diffusion process for the halftone processing ensures the sufficient picture quality, but undesirably lengthens the time required for the processing.

There has been no proposed technique that selectively applies the adequate method for the halftone processing of the respective dots created by the multi-valuing printer and specifies the sequence of making the respective dots subjected to the halftone processing, by taking into account these advantages and disadvantages. The problems discussed above arise not only in the printers but in a variety of printing apparatuses that can express the density of each pixel in three or a greater number of values by the inks of different densities and the dots having different ink weights.

SUMMARY OF THE INVENTION

The object of the present invention is thus to provide a technique that determines the on-off state of the respective dots in an adequate sequence and enables the printing of high picture quality in the multi-valuing printer that is provided with at least two inks having an identical hue but different densities and enables at least two different types of dots having different ink weights to be created by at least one ink among the at least two inks.

At least part of the above and the other related objects is realized by a first method of printing a multi-tone image as a distribution of dots created with a head wherein the head is provided with at least two different inks that have an identical hue but different densities and enables at least three different types of dots, which include at least two different types of dots that have different ink weights and are created by at least one ink among the at least two different inks, to be created on a printing medium. The first method includes the steps of: (a) inputting tone data of an image to be printed; (b) successively determining on-off state of the at least three different types of dots with respect to each pixel in a preset sequence, the preset sequence including a specific order of ink weight in which the at least two different types of dots created by the identical ink are consecutively subjected to the determination for the on-off state; and (c) driving the head based on results of the determination carried out in the step (b), so as to create the respective types of dots.

The step (b) includes the steps of: (b1) setting a recording ratio regarding each of the at least three different types of dots, based on the tone data; (b2) comparing the recording ratio set in the step (b1) for a specific dot, which is a first object of the determination, with a threshold value read from a dither matrix that has been provided in advance and determining on-off state of the specific dot based on a result of the comparison; and (b3) comparing a corrected recording ratio with the threshold value and determining on-off state of another dot, which is a second or subsequent object of the determination, based on a result of the comparison with respect to pixels in which all the dots previously subjected to the determination for the on-off state are set in the off state, the corrected recording ratio being obtained by correcting the recording ratio set in the step (b1) for the another dot with the recording ratios of all the dots previously subjected to the determination for the on-off state.

In the first method of the present invention, the step (b), which includes the steps (b1) through (b3), determines the on-off state of the respective dots according to the input tone data, while effectively preventing different types of dots from being created in an identical pixel in an overlapping manner. In one example, a dot is set in the on state when the recording ratio is greater than the threshold value stored in the dither matrix. With respect to the specific dot, which is a first target subjected to the determination for the on-off state, the dot is set in the on state in the pixels having relatively small threshold values read from the dither matrix corresponding to the recording ratio. The method determines the on-off state of another dot, which is a second target of the determination, in the pixels where the specific dot is in the off state. The pixels where the specific dot or the first target of the determination are in the off state have relatively large threshold values read from the dither matrix. If the on-off state of the second target dot is determined only according to the recording ratio of the second target dot, the probability of the on state of the second target dot is unjustifiably lowered. The step (b3) accordingly compares the sum of the recording ratio of the second target dot and the recording ratio of the first target dot with the threshold value. This prevents the unjustifiably high probability of non-creation of the second target dot and ensures a desired recording ratio. This arrangement determines the on-off state of the second target dot, while effectively preventing the second target dot from being created in an overlapping manner in the pixel where the first target dot already exists. This processing is executed for third and subsequent target dots.

In the step (b3), the method applied to make the recording ratios of all the dots previously subjected to the determination for the on-off state reflect on the recording ratio of a target dot currently processed depends upon when the dot is set in the on state, that is, when the recording ratio is greater than the threshold value or when the recording ratio is smaller than the threshold value. In the case where the dot is set in the on state when the recording ratio is greater than the threshold value, the recording ratios of all the dots previously subjected to the determination for the on-off state are added to the recording ratio of the target dot currently processed. In the case where the dot is set in the on state when the recording ratio is smaller than the threshold value, on the other hand, the recording ratios of all the dots previously subjected to the determination for the on-off state are subtracted from the recording ratio of the target dot currently processed.

The steps (b1) through (b3) are carried out independently of the type of ink. By way of example, it is assumed that four different types of dots are created by using two inks of different weights, that is, the deep ink and the light ink, in two different ink weights, that is, the large dot and the small dot. The determination for the on-off state is carried out in the sequence of 'the large dot by the deep ink', 'the small dot by the deep ink', 'the large dot by the light ink', and 'the small dot by the light ink'. According to the first method of the present invention, for example, the on-off state of the large dot by the light ink is determined by taking into account the recording ratios of the previously processed dots, that is, the large dot by the deep ink and the small dot by the deep ink. In this manner, the on-off state of the target dot is determined by taking into account the recording ratios of the previously processed dots, whether or not the type of the ink is identical. This arrangement effectively prevents the dots created by the inks of different densities from being created in an identical pixel in an overlapping manner.

In the first method of the present invention, the step (b) successively determines the on-off state of the respective dots in a preset sequence. In this case, the dots created by the identical ink are consecutively subjected to the determination for the on-off state in the order of ink weight. The four different types of dots are, for example, subjected to the determination for the on-off state in the sequence specified above. The determination may, however, be carried out in a different sequence, that is, in the sequence of 'the large dot by the light ink', 'the small dot by the light ink', 'the large dot by the deep ink', and 'the small dot by the deep ink'. The sequence is independent of the density expressed per unit area by each dot. The process of consecutively determining the on-off state of the dots created by the identical ink has the significant advantage, that is, the easy regulation of the dot creation even in the case where the dots should be created in an overlapping manner.

A variety of settings are possible for the recording ratios of the dots. The total of the recording ratios of the dots may exceed 100%. When the total recording ratio exceeds 100%, the dots of an identical hue are created in the same pixel in an overlapping manner. The dot-forming elements are provided separately for the dots that have the identical hue but are created by the inks of different densities. Creating these dots in an overlapping manner thus does not significantly affect the printing speed. When the dots by the identical ink are created in the same pixel in an overlapping manner, on the other hand, the same dot-forming element is driven twice or more for one identical pixel. This undesirably lowers the printing speed. The first method of the present invention consecutively determines the on-off state of the dots created by the identical ink. This ensures the easy regulation of these dots. Even when dots should be created in some pixels in an overlapping manner, the arrangement of the first method reduces the possibility of creating the dots by the identical ink in an overlapping manner and thereby prevents the printing speed from being significantly lowered.

In the step (b), the on-off state of the dots may be determined in an arbitrary sequence, as long as the dots created by the identical ink are consecutively subjected to the determination for the on-off state. One possible modification carries out the determination for the on-off state of the dots created by the lower-density ink before the determination for the on-off state of the dots created by the higher-density ink. The dots created by the identical ink may be subjected to the determination for the on-off state in a descending order of the ink weight or in an ascending order of the ink weight, or irrespective of the ink weight.

The sequence of the determination for the on-off state of the dot is not fixed but may be set adequately as discussed above. In the first method of the present invention, for example, it is preferable that the step (b) successively determines the on-off state of the at least three different types of dots in a descending order of ink density.

In general, the dots created by the high-density ink are readily recognized with eyes. The sufficient dispersibility of these dots is thus desired to ensure the high picture quality. The determination for the on-off state in the above sequence enables the dots created by the higher-density ink to have the higher degree of freedom in the determination for the on-off state. This arrangement ensures the sufficient dispersibility of the dots and thus improves the picture quality.

In accordance with one preferable application of the first method, the head enables creation of at least four different types of dots, which include dots formed in at least two different ink weights respectively by a deep ink having a higher ink density and a light ink having a lower ink density. In this structure, the step (b) first determines the on-off state of the dots created by the deep ink in a descending order of ink weight and subsequently determines the on-off state of the dots created by the light ink in a descending order of ink weight. The first method of the present invention is, however, naturally not restricted to this application.

The present invention is also directed to a second method of printing a multi-tone image as a distribution of dots created with a head, wherein the head is provided with at least two different inks that have an identical hue but different densities and enables at least three different types of dots, which include at least two different types of dots that have different ink weights and are created by at least one identical ink among the at least two different inks, to be created on a printing medium. The second method includes the steps of: (a) inputting tone data of an image to be printed; (b) dividing the at least three different types of dots according to a preset classification into a plurality of different types of dots having higher density evaluation values and at least one type of dot having a lower density evaluation value; (c) successively determining on-off state of the plurality of different types of dots having the higher density evaluation values with respect to each pixel in a preset sequence, the preset sequence including a specific order of ink weight in which the at least two different types of dots created by the identical ink are consecutively subjected to the determination for the on-off state; (d) determining on-off state of the at least one type of dot having the lower density evaluation value by an error diffusion method based on correction data, the correction data being obtained by correcting the tone data with density errors occurring due to the on-off state of the plurality of dots having the higher density evaluation values; and (e) driving the head based on results of the determinations carried out in the step (c) and the step (d), so as to create the respective types of dots.

The step (c) includes the steps of: (c1) setting a recording ratio regarding each of the plurality of different types of dots having the higher density evaluation values, based on the tone data; (c2) comparing the recording ratio set in the step (c1) for a specific dot, which is a first object of the determination, with a threshold value read from a dither matrix that has been provided in advance and determining on-off state of the specific dot based on a result of the comparison; and (c3) comparing a corrected recording ratio with the threshold value and determining on-off state of another dot, which is a second or subsequent object of the determination, based on a result of the comparison with respect to pixels in which all the dots previously subjected to the determination for the on-off state are set in the off state, the corrected recording ratio being obtained by correcting the recording ratio set in the step (c1) for the another dot with the recording ratios of all the dots previously subjected to the determination for the on-off state.

The second method of the present invention divides the dots into two groups according to the density evaluation value. The density evaluation value represents the density expressible of the dot per unit area. The second method applies the different methods of determination to the dots having the lower density evaluation values and the dots having the higher density evaluation values. The error diffusion method is adopted in the determination for the on-off state of the dots having the lower density evaluation values, whereas the dither method is adopted in the determination for the on-off state of the dots having the higher density evaluation values. As discussed previously in the first method of the present invention, the determination for the on-off state by the dither method in the step (b) ensures the dispersibility of the dots having the identical hue.

When the dither method is adopted in the determination for the on-off state of the dot, there may be a relatively large local error occurring as the difference between the density expressed according to the result of the determination and the density to be expressed according to the tone data. Application of the error diffusion method to the determination for the on-off state of the dot effectively reduces the local error. The second method of the present invention, the error diffusion method that takes advantage of the density errors arising due to the on-off state of the other dots is adopted in the determination for the on-off state of the dot having the lower density evaluation value. This arrangement effectively reduces the local density error and thus enables the printing of high picture quality.

An arbitrary number of dots having the lower density evaluation values may be selected as the dot having the lower density evaluation value in the second method among the at least three different types of dots created by the head. It is, however, necessary to cause a plurality of dots having the higher density evaluation values to be processed by the dither method. The dots having the lower density evaluation values are not restricted to the dots created by the identical ink.

For example, the at least one type of dot having the lower density evaluation value may be a dot having a lowest density evaluation value among the at least three different types of dots created with the head.

The disadvantage of the error diffusion method is a long processing time. The second method of the present invention adopts the error diffusion method only to the dot having the lowest density evaluation value. This arrangement thus does not significantly increase the processing time while realizing the printing of high picture quality. The dot having the lowest density evaluation value is generally conspicuous with eyes. Application of the error diffusion method to this dot advantageously cancels the local density error without making the dot conspicuous.

Like the first method discussed above, the second method of the present invention carries out the determination for the on-off state of a target dot according to the dither method, by taking into account the recording ratios of all the dots previously subjected to the determination for the on-off state, whether or not the respective dots are created by the identical ink. In accordance with one preferable application of the second method, the step (c) accordingly carries out the determination for the on-off state of the respective dots with a single dither matrix, whether or not the respective dots are created by the identical ink. In another example, the recording ratios of the dots created by the identical ink and previously subjected to the determination for the on-off state may be made to reflect on the recording ratio of the currently processed target pixel. It is here desirable that different dither matrixes are used for different inks, in order to ensure the sufficient dispersibility of the dots created by the different inks. It is possible to provide completely different dither matrixes for the respective inks, but the following application is more practical and preferable.

In accordance with one preferable application of the second method, the step (c) further includes the step of: (c0) providing a new dither matrix, which includes threshold values in a different arrangement specified for each of the at least two different inks, from a dither matrix stored in advance. The step (c) accordingly performs the step (c2) and the step (c3) to carry out the determination for the on-off state with the dither matrix corresponding to each of the at least two different inks, with respect to each dot created by the ink.

The method of this structure enables a dither matrix corresponding to each ink to be newly prepared from the dither matrix that has been stored in advance. This arrangement desirably saves the required capacity of the memory for storing the dither matrixes. The preparation of the dither matrix corresponding to each ink may be implemented by changing the mapping of the dither matrix to the pixels for each ink. It is not necessary to store the newly prepared dither matrix in the memory, before the dither matrix is used in the determination for the on-off state of the dot.

The above application causes the recording ratios of the dots created by the identical ink and previously subjected to the determination for the on-off state to be reflected separately on the recording ratio of the currently processed target pixel and exerts the following effects. In the structure that makes the recording ratios of all the dots previously processed reflect on the recording ratio of the target pixel, when the total of the recording ratios of the dots exceeds 100%, the process of determining the on-off state of the dot may become undesirably complicated. The structure that makes the recording ratios of the dots created by the identical ink and processed previously reflect on the recording ratio of the target pixel, on the other hand, effectively prevents the dots by the identical ink from being created in an identical pixel in an overlapping manner, whereas allowing the dots by the different inks to be created in an identical pixel in an overlapping manner. The latter structure enables the parallel determination for the on-off state of the dots for the respective inks, thereby ensuring the higher-speed processing. This arrangement also ensures the easy regulation of the recording ratios of the dots created by the identical ink, thereby enabling the amount of ink spout to be controlled by the simple procedure.

The second method of the present invention is applicable to the printing apparatus that can create dots in a variety of ink weights with inks of varies densities. In accordance with one concrete application of the second method, for example, the head enables creation of at least four different types of dots, which include dots formed in at least two different ink weights respectively by a deep ink having a higher ink density and a light ink having a lower ink density. The at least one type of dot having the lower density evaluation value is a dot that has a lowest density evaluation value and is created by the light ink. In this structure, the step (c) excludes the dot that has the lowest density evaluation value and is created by the light ink, first determines the on-off state of the dots created by the deep ink in a descending order of ink weight, and subsequently determines the on-off state of the dots created by the light ink in a descending order of ink weight. The second method is, however, naturally not restricted to this concrete application.

The present invention is further directed to a first printing apparatus that enables a multi-tone image to be printed as a distribution of dots created with a head, wherein the head is provided with at least two different inks that have an identical hue but different densities and enables at least three different types of dots, which include at least two different types of dots that have different ink weights and are created by at least one ink among the at least two different inks, to be created on a printing medium. The first printing apparatus includes: an input unit that inputs tone data of an image to be printed; a dither determination unit that successively determines on-off state of the at least three different types of dots with respect to each pixel in a preset sequence, the preset sequence including a specific order of ink weight in which the at least two different types of dots created by the identical ink are consecutively subjected to the determination for the on-off state; and a dot creation unit that drives the head based on results of the determination carried out by the dither determination unit, so as to create the respective types of dots.

The dither determination unit includes: a memory unit in which a relationship between tone data and a recording ratio regarding each of the at least three different types of dots is stored; a setting unit that refers to the memory unit and sets the recording ratio of each of the at least three different types of dots corresponding to the input tone data; and a dot creation determination unit that compares a corrected recording ratio of a target dot with a threshold value stored in a dither matrix that has been provided in advance, the corrected recording ratio being obtained by correcting the recording ratio of the target dot set by the setting unit with the recording ratios of all the dots previously subjected to the determination for the on-off state, the dot creation determination unit then determining on-off state of the target dot with respect to pixels in which all the dots previously subjected to the determination for the on-off state are set in the off state, based on a result of the comparison.

In accordance with one preferable application of the first printing apparatus, the dither determination unit successively determines the on-off state of the at least three different types of dots in a descending order of ink density.

In accordance with another preferable application of the first printing apparatus, the head enables creation of at least four different types of dots, which include dots formed in at least two different ink weights respectively by a deep ink having a higher ink density and a light ink having a lower ink density. In this structure, the dither determination unit first determines the on-off state of the dots created by the deep ink in a descending order of ink weight and subsequently determines the on-off state of the dots created by the light ink in a descending order of ink weight.

The present invention is also directed to a second printing apparatus that enables a multi-tone image to be printed as a distribution of dots created with a head, wherein the head is provided with at least two different inks that have an identical hue but different densities and enables at least three different types of dots, which include at least two different types of dots that have different ink weights and are created by at least one ink among the at least two different inks, to be created on a printing medium. The second printing apparatus includes: a storage unit that stores divisions, which are obtained by dividing the at least three different types of dots according to a preset classification into a plurality of different types of dots having higher density evaluation values and at least one type of dot having a lower density evaluation value; an input unit that inputs tone data of an image to be printed; a dither determination unit that successively determines on-off state of the plurality of different types of dots having the higher density evaluation values with respect to each pixel in a preset sequence, the preset sequence including a specific order of ink weight in which the at least two different types of dots created by the identical ink are consecutively subjected to the determination for the on-off state; an error diffusion determination unit that determines on-off state of the at least one type of dot having the lower density evaluation value by an error diffusion method based on correction data, the correction data being obtained by correcting the tone data with density errors occurring due to the on-off state of the plurality of dots having the higher density evaluation values; and a dot creation unit that drives the head based on results of the determinations carried out by the dither determination unit and the error diffusion determination unit, so as to create the respective types of dots.

The dither determination unit includes: a memory unit in which a relationship between tone data and a recording ratio regarding each of the plurality of different types of dots having the higher density evaluation values is stored; a setting unit that refers to the memory unit and sets the recording ratio of each of the plurality of different types of dots having the higher density evaluation values corresponding to the input tone data; and a dot creation determination unit that compares a corrected recording ratio of a target dot with a threshold value stored in a dither matrix that has been provided in advance, the corrected recording ratio being obtained by correcting the recording ratio of the target dot set by the setting unit with the recording ratios of all the dots previously subjected to the determination for the on-off state, the dot creation determination unit then determining on-off state of the target dot with respect to pixels in which all the dots previously subjected to the determination for the on-off state are set in the off state, based on a result of the comparison.

In the second printing apparatus, it is preferable that the at least one type of dot having the lower density evaluation value is a dot having a lowest density evaluation value among the at least three different types of dots created with the head.

In accordance with one preferable application of the second printing apparatus, the dither determination unit carries out the determination for the on-off state of the respective dots with a single dither matrix, whether or not the respective dots are created by the identical ink.

In accordance with another preferable application of the second printing apparatus, the dither determination unit further includes: a dither matrix generation unit that provides a new dither matrix, which includes threshold values in a different arrangement specified for each of the at least two different inks, from a dither matrix stored in advance; and a decision unit that carries out the determination for the on-off state with the dither matrix corresponding to each of the at least two different inks, with respect to each dot created by the ink.

In accordance with still another preferable application of the second printing apparatus, the head enables creation of at least four different types of dots, which include dots formed in at least two different ink weights respectively by a deep ink having a higher ink density and a light ink having a lower ink density. The at least one type of dot having the lower density evaluation value is a dot that has a lowest density evaluation value and is created by the light ink. In this structure, the dither determination unit excludes the dot that has the lowest density evaluation value and is created by the light ink, first determines the on-off state of the dots created by the deep ink in a descending order of ink weight, and subsequently determines the on-off state of the dots created by the light ink in a descending order of ink weight.

These printing apparatuses can actualize one of the methods of the present invention discussed above. In the first printing apparatus, the input unit, the dither determination unit, and the dot creation unit may be incorporated in the same casing or in different casings. Similarly, in the second printing apparatus, the input unit, the dither determination unit, the error diffusion determination unit, and the dot creation unit may be incorporated in the same casing or in different casings. The printing apparatus may have a plurality of casings, which respectively include some of the required elements in an arbitrary combination.

The method of the present invention is actualized by the printing apparatus that drives with the data processed by the computer according to a preset program. The method of the present invention is accordingly realized by a recording medium in which such a program is recorded.

The present invention is thus directed to a first recording medium in which a program for enabling a multi-tone image to be printed by a printing apparatus is recorded in a computer readable manner, wherein the printing apparatus is provided with at least two different inks that have an identical hue but different densities and enables at least three different types of dots, which include at least two different types of dots that have different ink weights and are created by at least one ink among the at least two different inks, to be created on a printing medium. The program includes: a program code that causes a computer to successively determine on-off state of the at least three different types of dots with respect to each pixel in a preset sequence, the preset sequence including a specific order of ink weight in which the at least two different types of dots created by the identical ink are consecutively subjected to the determination for the on-off state.

The program code causes the computer to actualize the functions of: setting a recording ratio regarding each of the at least three different types of dots, based on tone data of an original image; comparing the recording ratio of a specific dot, which is a first object of the determination, with a threshold value read from a dither matrix that has been provided in advance and determining on-off state of the specific dot based on a result of the comparison; and comparing a corrected recording ratio with the threshold value and determining on-off state of another dot, which is a second or subsequent object of the determination, based on a result of the comparison with respect to pixels in which all the dots previously subjected to the determination for the on-off state are set in the off state, the corrected recording ratio being obtained by correcting the recording ratio of the another dot with the recording ratios of all the dots previously subjected to the determination for the on-off state.

In accordance with one preferable application of the first recording medium, the program code causes the computer to successively determine the on-off state of the at least three different types of dots in a descending order of ink density.

In accordance with another preferable application of the first recording medium, the printing apparatus enables creation of at least four different types of dots, which include dots formed in at least two different ink weights respectively by a deep ink having a higher ink density and a light ink having a lower ink density. In this structure, the program code causes the computer to first determine the on-off state of the dots created by the deep ink in a descending order of ink weight and subsequently determine the on-off state of the dots created by the light ink in a descending order of ink weight.

The present invention is further directed to a second recording medium in which a program for enabling a multi-tone image to be printed by a printing apparatus is recorded in a computer readable manner, wherein the printing apparatus is provided with at least two different inks that have an identical hue but different densities and enables at least three different types of dots, which include at least two different types of dots that have different ink weights and are created by at least one ink among the at least two different inks, to be created on a printing medium. The program includes: a first program code that causes a computer to divide the at least three different types of dots according to a preset classification into a plurality of different types of dots having higher density evaluation values and at least one type of dot having a lower density evaluation value; a second program code that causes the computer to successively determine on-off state of the plurality of different types of dots having the higher density evaluation values with respect to each pixel in a preset sequence, the preset sequence including a specific order of ink weight in which the at least two different types of dots created by the identical ink are consecutively subjected to the determination for the on-off state; and a third program code that causes the computer to determine on-off state of the at least one type of dot having the lower density evaluation value by an error diffusion method based on correction data, the correction data being obtained by correcting the tone data with density errors occurring due to the on-off state of the plurality of dots having the higher density evaluation values.

The second program code causes the computer to actualize the functions of: setting a recording ratio regarding each of the plurality of different types of dots having the higher density evaluation values, based on tone data of an original image; comparing the recording ratio of a specific dot, which is a first object of the determination, with a threshold value read from a dither matrix that has been provided in advance and determining on-off state of the specific dot based on a result of the comparison; and comparing a corrected recording ratio with the threshold value and determining on-off state of another dot, which is a second or subsequent object of the determination, based on a result of the comparison with respect to pixels in which all the dots previously subjected to the determination for the on-off state are set in the off state, the corrected recording ratio being obtained by correcting the recording ratio of the another dot with the recording ratios of all the dots previously subjected to the determination for the on-off state.

In the second recording medium of the present invention, it is preferable that the at least one type of dot having the lower density evaluation value is a dot having a lowest density evaluation value among the at least three different types of dots created by the printing apparatus.

In accordance with one preferable application of the second recording medium, the second program code causes the computer to carry out the determination for the on-off state of the respective dots with a single dither matrix, whether or not the respective dots are created by the identical ink.

In accordance with another preferable application of the second recording medium, the second program code further causes the computer to actualize the functions of: providing a new dither matrix, which includes threshold values in a different arrangement specified for each of the at least two different inks, from a dither matrix stored in advance; and carrying out the determination for the on-off state with the dither matrix corresponding to each of the at least two different inks, with respect to each dot created by the ink.

In accordance with still another preferable application of the second recording medium, the printing apparatus enables creation of at least four different types of dots, which include dots formed in at least two different ink weights respectively by a deep ink having a higher ink density and a light ink having a lower ink density. The at least one type of dot having the lower density evaluation value is a dot that has a lowest density evaluation value and is created by the light ink. In this structure, the second program code causes the computer to exclude the dot that has the lowest density evaluation value and is created by the light ink, first determine the on-off state of the dots created by the deep ink in a descending order of ink weight, and subsequently determine the on-off state of the dots created by the light ink in a descending order of ink weight.

The computer executes the program recorded in any one of the above recording media, so as to actualize the printing method of the present invention discussed above. Available examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media. Still another application is a program supply apparatus that supplies a computer program, which causes the computer to actualize the multi-valuing functions of the image processing apparatus discussed above, to the computer via a communications path.

These and other objects, features, aspects, and advantages of the present invention will become more apparent from the following detailed description of the preferred embodiments with the accompanying drawings.

BRIEF DESCRIPTION OF THE DRAWINGS

FIG. 12 shows part of a dither matrix used in the embodiment;

FIG. 14A through FIG. 14G show a process of dot creation by the method of this embodiment;

FIG. 16 shows a relationship between dither matrixes used in the second embodiment;

FIG. 17A and FIG. 17B show creation of deep dots and light dots in the second embodiment;

FIG. 18 shows an example of weights set in an error diffusion method; and

DESCRIPTION OF THE PREFERRED EMBODIMENTS

Some modes of carrying out the present invention are discussed below as preferred embodiments.

(1) Structure of System

Figure 1:
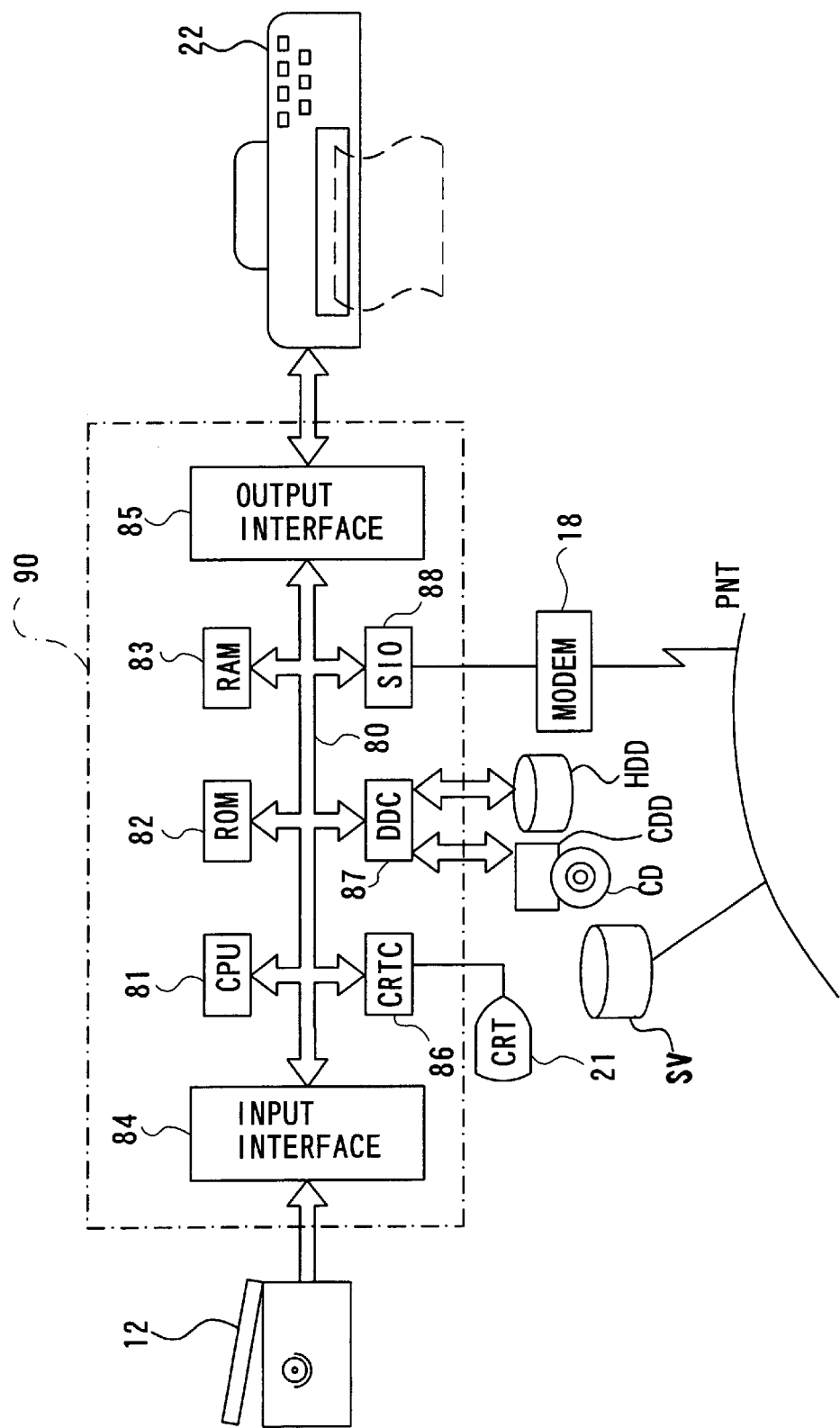
FIG. 1 is a block diagram schematically illustrating the structure of a printing system including a printing apparatus embodying the present invention.

As illustrated in FIG. 1, the printing system includes a scanner 12 and a color printer 22 that are connected to a computer 90. The computer 90 loads and executes predetermined programs and thereby functions as a printing apparatus. The computer 90 includes a CPU 81, which carries out a variety of operations to control the printing-related actions according to the programs, and a variety of elements mutually connected via a bus 80. A variety of programs and data required for the CPU 81 to carry out the variety of operations have stored in advance in a ROM 82. A variety of programs and data required for the CPU 81 to carry out the variety of operations are temporarily written in and read from a RAM 83. An input interface 84 is in charge of input of signals from the scanner 12 and a keyboard 14, whereas an output interface 85 is in charge of output of data to the printer 22. A CRTC 86 controls output of signals to a CRT 21 that is capable of color display. A disk controller (DDC) 87 controls transmission of data to and from a hard disk 16, a CD-ROM drive 15, and a flexible disk drive (not shown). A variety of programs loaded to the RAM 83 and executed by the CPU 81 as well as a variety of programs provided in the form of a device driver are recorded in the hard disk 16.

A serial input-output interface (SIO) 88 is further connected to the bus 80. The SIO 88 is connected with a public telephone network PNT via a modem 18. The computer 90 connects with an external network via the SIO 88 and the modem 18. Connection of the computer 90 with a specific server SV enables programs required for printing an image to be downloaded to the hard disk 16. Another possible application loads the required programs from a flexible disk FD or a CD-ROM and causes the computer 90 to execute the required programs. All the programs required for printing an image may be loaded collectively or alternatively only part of the programs that are characteristic of the embodiment may be loaded in the form of a module.

Figure 2:
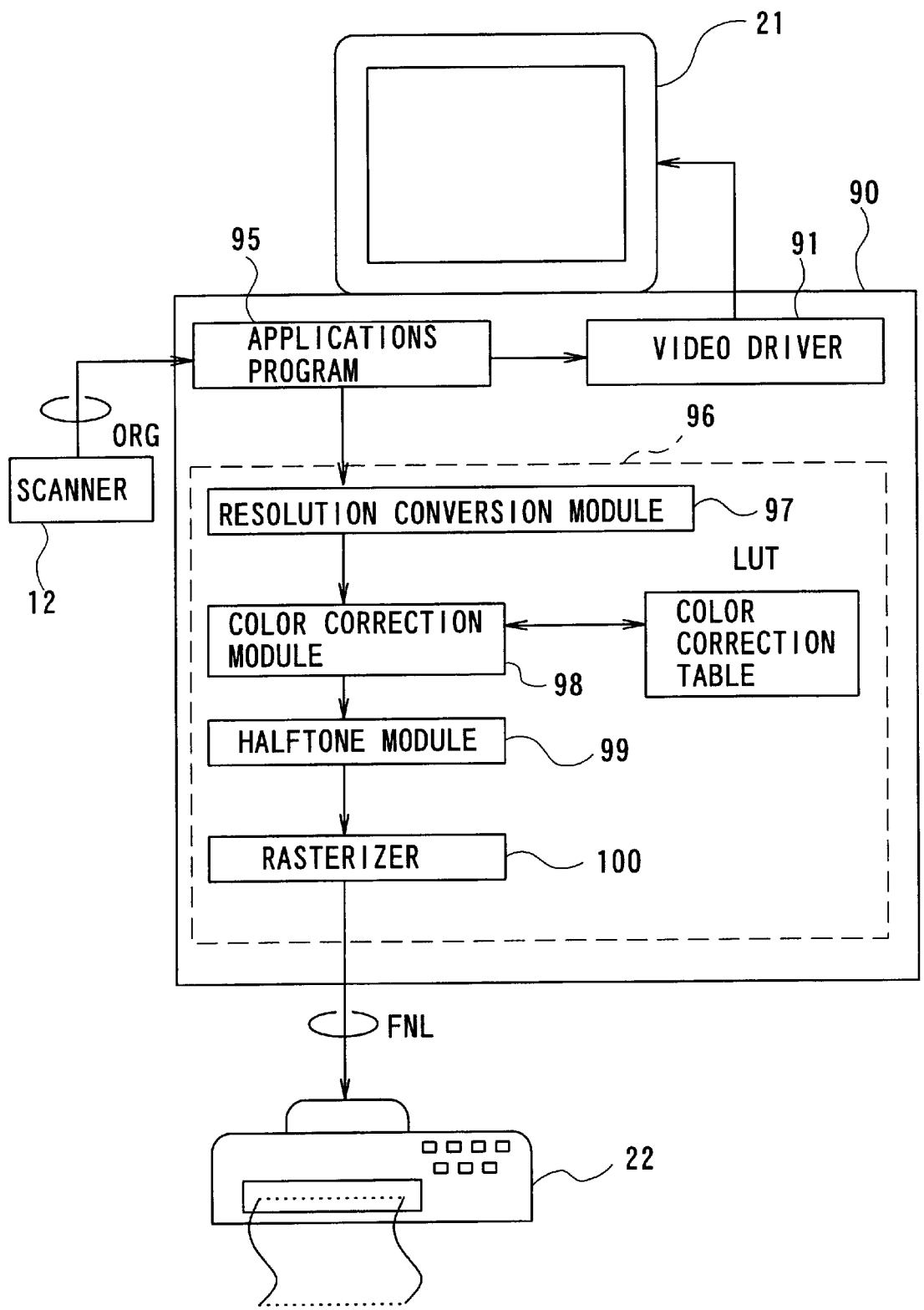
FIG. 2 is a block diagram illustrating the software structure of the printing apparatus.

FIG. 2 is a block diagram illustrating the software structure of the printing apparatus. In the computer 90, an applications program 95 works under a predetermined operating system. A video driver 91 and a printer driver 96 are incorporated in the operating system. The applications program 95 reads an image from the scanner 12, causes the input image to be subjected to a predetermined process, such as retouch of the image, and causes the processed image to be displayed on the CRT display 21 via the video driver 91. Original color image data ORG supplied from the scanner 12 are read from a color original and consists of three color components, red (R), green (G), and blue (B).

When the applications program 95 issues a printing instruction, the printer driver 96 in the computer 90 receives image data from the applications program 95 and converts the input image data into signals processible by the printer 22, that is, multi-valued signals for the respective colors, cyan, magenta, yellow, and black. In the example of FIG. 2, the printer driver 96 includes a resolution conversion module 97, a color correction module 98, a color correction table LUT, a halftone module 99, and a rasterizer 100.

The resolution conversion module 97 converts the resolution of the color image data processed by the applications program 95, that is, the number of pixels per unit length, into the resolution processible by the printer driver 96. The image data after the resolution conversion is still he image information of three color components, R, G, and B. The color correction module 98 refers to the color correction table LUT and converts the image data of R, G, and B with respect to each pixel into image data of the respective colors, cyan (C), magenta (M), yellow (Y), and black (K) used by the printer 22. The color corrected data have tone values, for example, in the range of 256 tones. The halftone module 99 creates dots in a dispersing manner and thereby implements the halftone processing, which enables the printer 22 to express the tone values. The rasterizer 100 sorts the processed image data out in the sequence of data to be transferred to the printer 22 and outputs the sorted data as final print data FNL. Although the printer 22 simply creates dots according to the final print data FNL and does not carry out any of the above image processing operations in this embodiment, the printer 22 may alternatively carry out part or all of the image processing operations.

Figure 3:
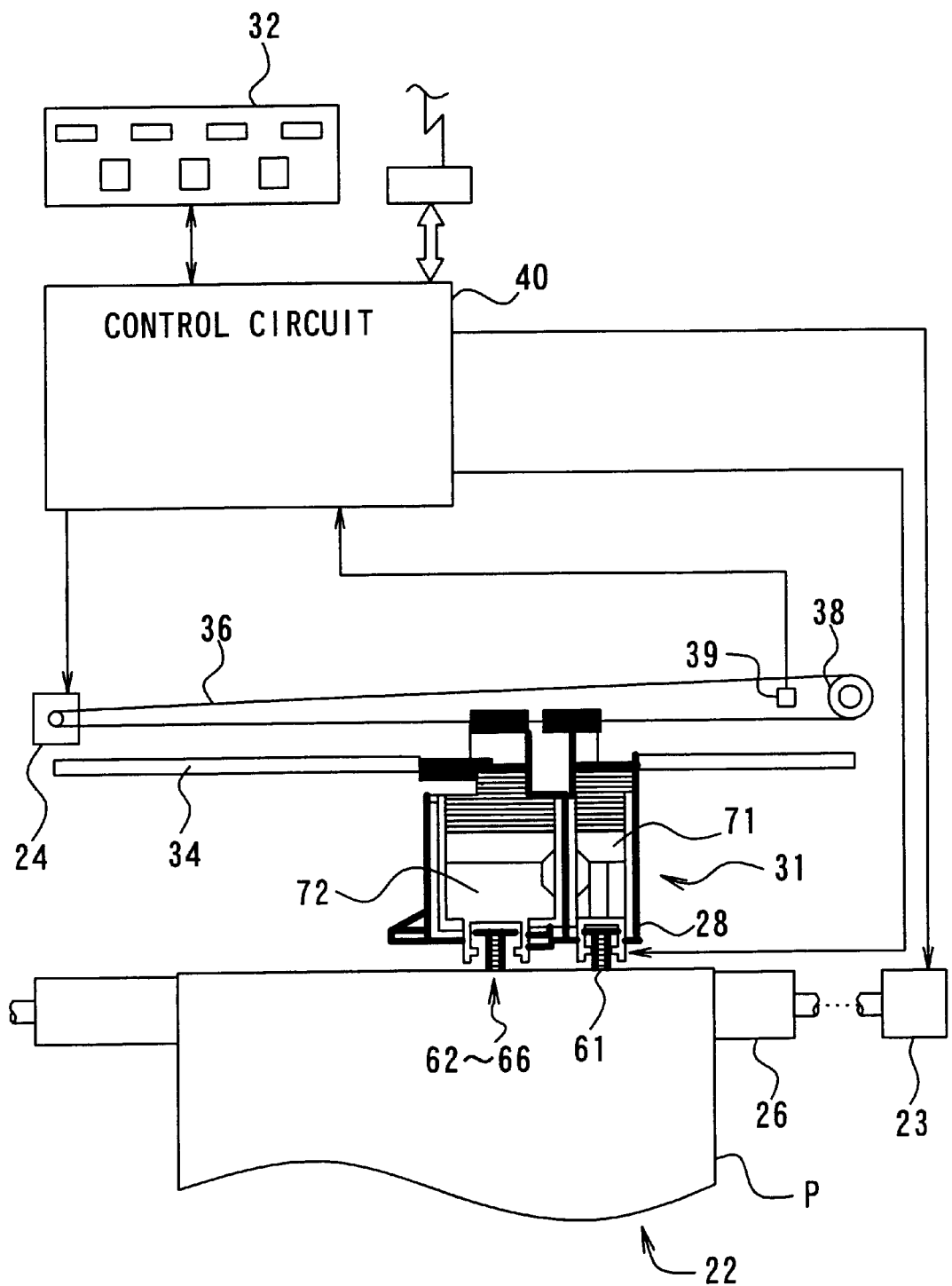
FIG. 3 schematically illustrates the structure of a printer 22.

The schematic structure of the printer 22 used in this embodiment is described with the drawing of FIG. 3. As illustrated in FIG. 3, the printer 22 has a mechanism for causing a sheet feed motor 23 to feed a sheet of printing paper P, a mechanism for causing a carriage motor 24 to move a carriage 31 forward and backward along an axis of a platen 26, a mechanism for driving a print head 28 mounted on the carriage 31 to control spout of ink and creation of dots, and a control circuit 40 that controls transmission of signals to and from the sheet feed motor 23, the carriage motor 24, the print head 28, and a control panel 32.

The mechanism for reciprocating the carriage 31 along the axis of the platen 26 includes a sliding shaft 34 that is arranged in parallel to the axis of the platen 26 and slidably supports the carriage 31, an endless drive belt 36 that is spanned between the carriage motor 24 and a pulley 38, and a position sensor 39 that detects the position of the origin of the carriage 31.

A black ink cartridge 71 for black ink (K) and a color ink cartridge 72, in which five color inks, that is, cyan (C), light cyan (LC), magenta (M), light magenta (LM), and yellow (Y), are accommodated, may be mounted on the carriage 31 in this printer 22. A total of six ink spout heads 61 through 66 are formed on the print head 28 that is disposed in the lower portion of the carriage 31. An ink conduit 68 is also disposed in the bottom portion of the carriage 31 to lead a supply of ink from the ink tank to each of the ink spout heads 61 through 66 as shown in FIG. 4.

FIG. 4 schematically illustrates the internal structure of the print head 28. For convenience of illustration, FIG. 4 only shows the elements relating to the spout of black ink (K), cyan (C), and light cyan (LC). In the actual structure, however, the six ink spout heads 61 through 66 of the respective colors are arranged as shown in the plan view of FIG. 5. When the ink cartridges 71 and 72 are attached to the carriage 31, supplies of inks of the respective colors are led from the ink cartridges 71 and 72 to the ink spout heads 61 through 66 formed in the print head 28 via the ink conduits 68 shown in FIG. 4.

Figure 4A:
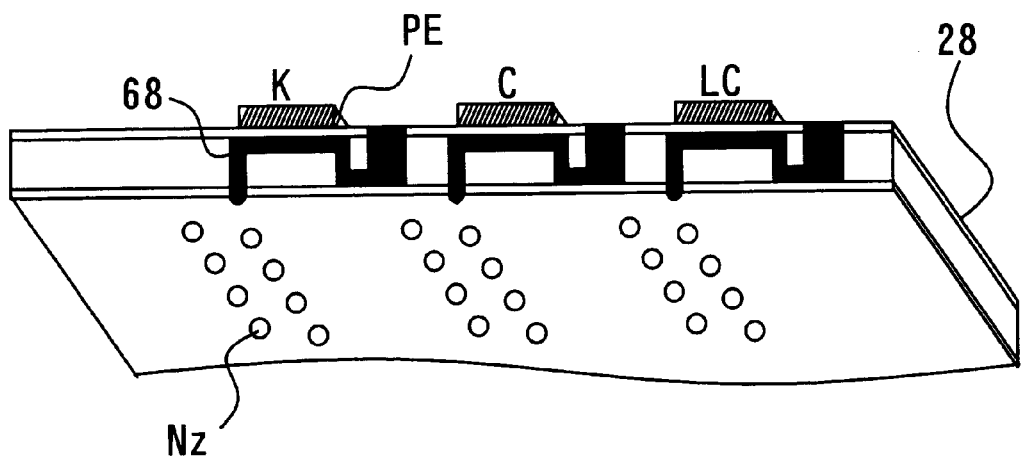
FIG. 4A and FIG. 4B show the principle of dot creation in the printer 22.
Figure 4B:
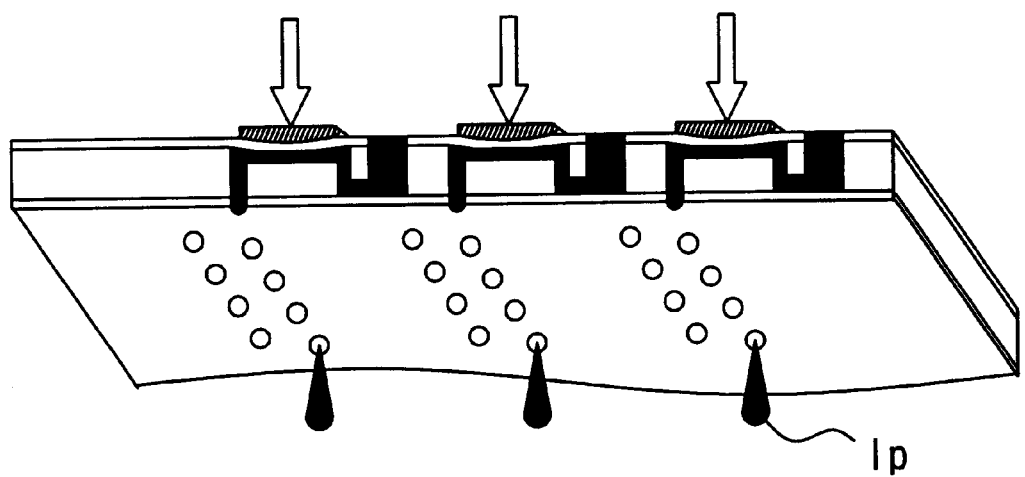
Figure 5:
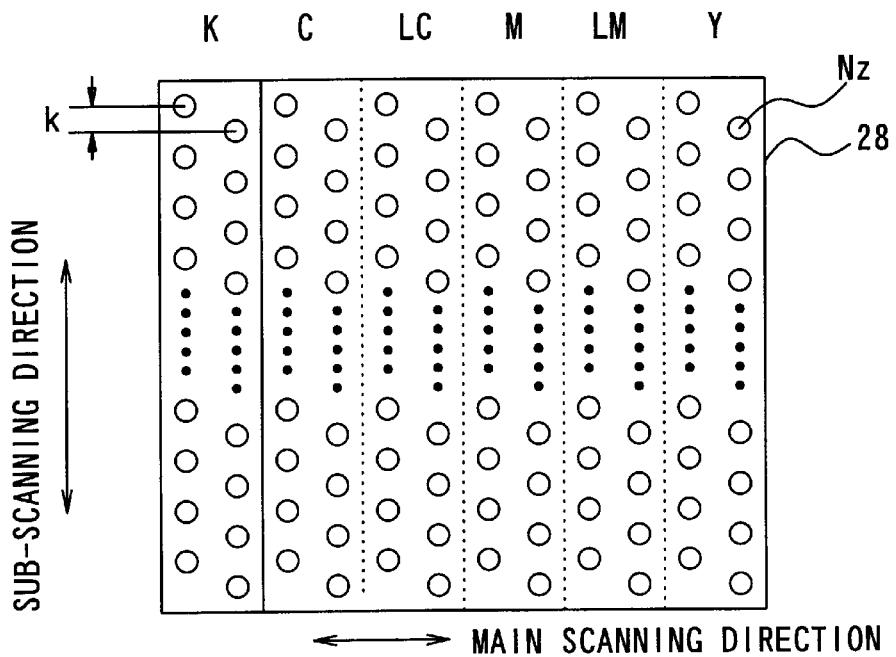
FIG. 5 shows an arrangement of nozzles in the printer 22.

A plurality of nozzles Nz are formed in each of the ink spout heads 61 through 66 as shown in FIG. 5. A piezoelectric element PE, which is one of electrically distorting elements and has an excellent response, is arranged for each nozzle Nz as shown in FIG. 4A. As is known, the piezoelectric element PE has a crystal structure that is subjected to mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 68 as shown by the arrows in FIG. 4B. The volume of the ink conduit 68 is reduced with the extension of the piezoelectric element PE, and a certain amount of ink corresponding to the reduced volume is sprayed as an ink particle Ip from the end of the nozzle Nz at a high speed. The ink particles Ip soak into the printing paper P set on the platen 26, so as to implement printing.

FIG. 5 shows an arrangement of ink jet nozzles Nz on the ink spout heads 61 through 66. The nozzle arrangement includes six nozzle arrays, wherein each nozzle array spouts ink of each color and includes forty-eight nozzles Nz arranged in zigzag at a fixed nozzle pitch k. The positions of the corresponding nozzles in a sub-scanning direction are identical in the respective nozzle arrays. The forty-eight nozzles Nz included in each nozzle array may be arranged in alignment instead of in zigzag. The zigzag arrangement shown in FIG. 5, however, allows a small value to be set to the nozzle pitch k in the manufacturing process.

Figure 6:
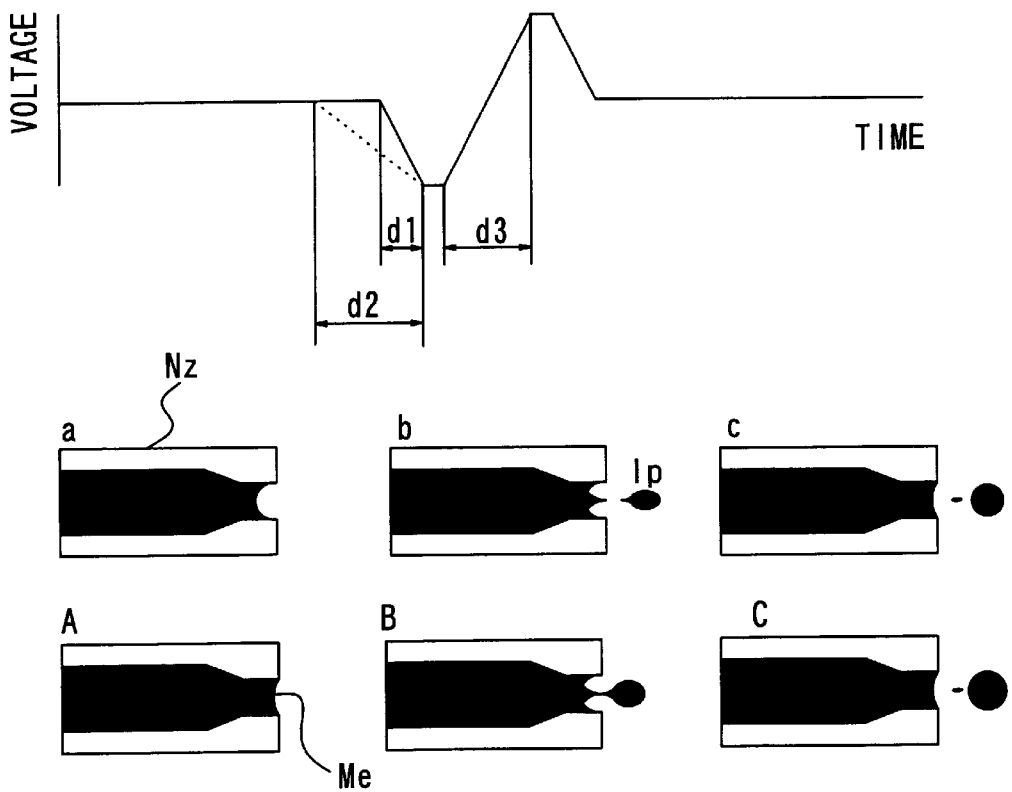
FIG. 6 shows the principle of creating dots having different diameters by the printer 22.

The printer 22 can create three different types of dots having different ink weights, that is, large dots, medium dots, and small dots, with the nozzles Nz of a fixed diameter shown in FIG. 5. The following describes the principle of such dot creation technique. FIG. 6 shows the relationship between the driving waveform of the nozzle Nz and the size of the ink particle Ip spouted from the nozzle Nz. The driving waveform shown by the broken line in FIG. 6 is used to create standard-sized dots. A decrease in potential of the piezoelectric element PE in a division d2 deforms the piezoelectric element PE in the direction of increasing the cross section of the ink conduit 68, contrary to the case discussed previously with the drawing of FIG. 4. Such deformation of the ink conduit 68 is implemented at the higher speed than the speed of ink supply from the ink conduit 68. As shown in a state A of FIG. 6, an ink interface Me, which is generally referred to as meniscus, is thus slightly concaved inward the nozzle Nz. When the driving waveform shown by the solid line in FIG. 6 is used to abruptly lower the potential in a division d1, on the other hand, the deformation speed of the ink conduit 68 is further increased and the meniscus is more significantly concaved inward the nozzle Nz as shown in a state 'a', compared with the state A. A subsequent increase in voltage applied to the piezoelectric element PE in a division d3 causes the ink to be spouted, based on the principle described previously with the drawing of FIG. 4. As shown in states B and C, a large ink droplet is spouted when the meniscus is only slightly concaved inward (state A). As shown in states 'b' and 'c', on the other hand, a small ink droplet is spouted when the meniscus is significantly concaved inward (state 'a').

Figure 7:
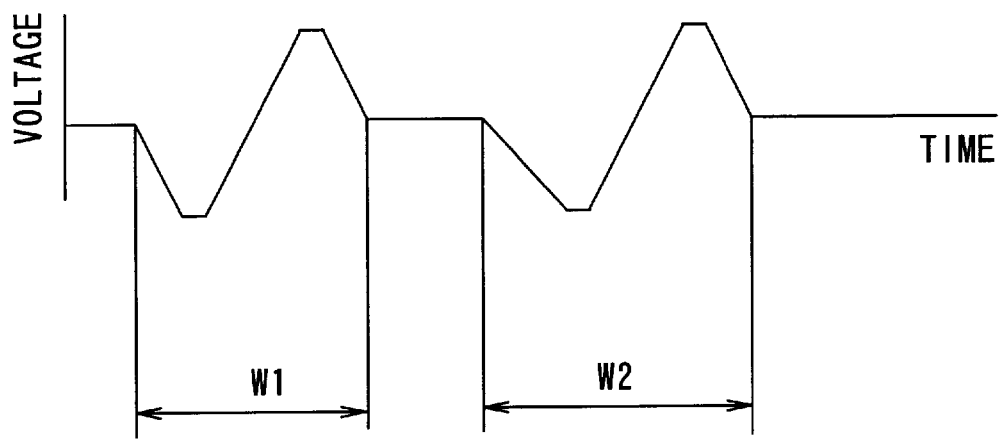
FIG. 7 shows a process of creating a large dot by the printer 22.
Figure 7:
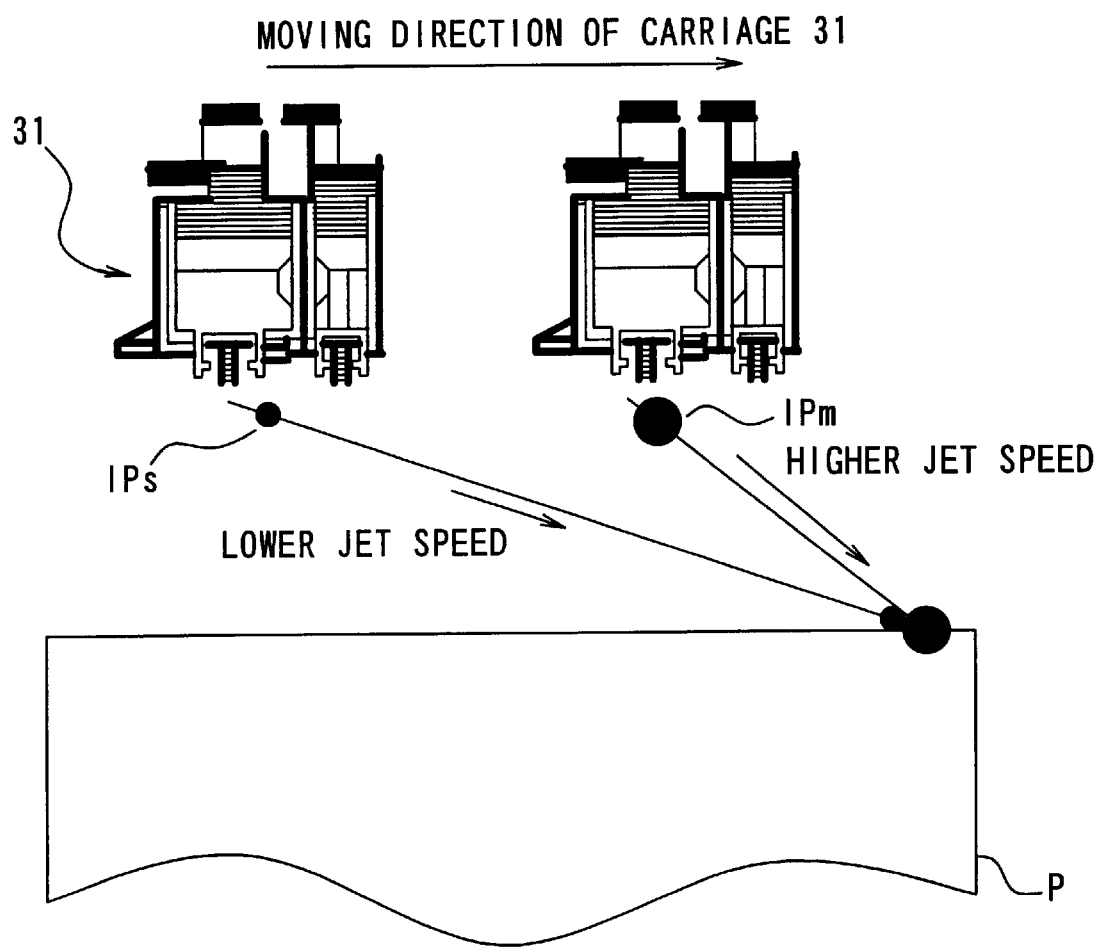

Based on the above principle, the ink weight spouted from each nozzle may be varied according to the driving waveform for driving the nozzle, that is, according to the rate of change in the divisions d1 and d2 where the potential of the piezoelectric element PE is lowered. This embodiment provides two different driving waveforms, that is, one for creating small dots IPs and the other for creating medium dots IPm. FIG. 7 shows driving waveforms used in this embodiment. A driving waveform W1 is used to create the small dots IPs, whereas a driving waveform W2 is used to create the medium dots IPm. As shown in FIG. 7, the jet speed of an ink droplet increases with an increase in ink weight. These two driving waveforms enable two different types of dots, having different ink weights, that is, the small dot and the medium dot, to be created with the nozzle Nz of an identical diameter. The printer 22 of this embodiment consecutively and periodically outputs these driving waveforms in the sequence of W1 and W2 with a movement of the carriage 31.

Large dots are created by using both the driving waveforms W1 and W2 shown in FIG. 7. The lower part of FIG. 7 shows the process of hitting an ink droplet IPs for the small dot and an ink droplet IPm for the medium dot spouted from the nozzle against the printing paper P. When both the small dot and the medium dot are created with the driving waveforms of FIG. 7, the ink droplet IPm for the medium dot has a higher jet speed. Namely there is a difference in jet speed between these two types of ink droplets. Regulation of the timings for successively spouting the ink droplet IPs for the small dot and the ink droplet IPm for the medium dot according to the difference in jet speed between the ink droplets and the moving speed of the carriage 31 in the main scanning direction enables both the ink droplets to reach the printing paper P at a substantially identical timing. In this manner, the embodiment creates a large dot having the greatest ink weight with the two driving waveforms shown in the upper part of FIG. 7.

In the printer 22 having the hardware structure discussed above, while the sheet feed motor 23 feeds the printing paper P (hereinafter referred to as the sub-scan), the carriage motor 24 moves the carriage 31 forward and backward (hereinafter referred to as the main scan), simultaneously with actuation of the piezoelectric elements PE on the respective ink spout heads 61 through 66 of the print head 28. The printer 22 accordingly sprays the respective color inks to create dots and thereby forms a multi-color image on the printing paper P.

In this embodiment, the printer 22 has the head that uses the piezoelectric elements PE to spout ink as discussed previously. The printer may, however, adopt another technique for spouting ink. One available structure of the printer supplies electricity to a heater installed in an ink conduit and utilizes the bubbles generated in the ink conduit to spout ink.

(2) Dot Creation Process

Figure 8:
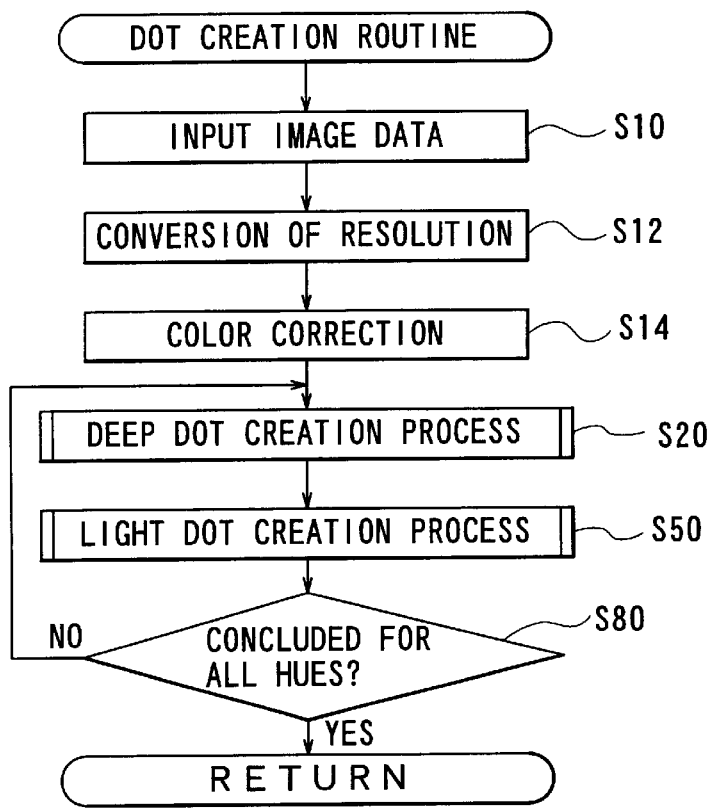
FIG. 8 is a flowchart showing a dot creation routine executed in the embodiment.

FIG. 8 is a flowchart showing a routine of dot creation process executed in this embodiment. The CPU 81 of the computer 90 carries out this dot creation routine. When the program enters the dot creation routine, the CPU 81 first inputs image data at step S10. The image data are supplied from the applications program 95 shown in FIG. 2 and have tone values of 256 stages in the range of 0 to 255 with respect to each color R, G, or B for each pixel included in the image. The resolution of the image data depends upon, for example, the resolution of the original image data ORG.

The CPU 81 then converts the resolution of the input image data into the printing resolution that enables the printer 22 to print an image at step S12. In the case where the resolution of the input image data is lower than the printing resolution, the linear interpolation is performed to generate new data between the adjoining image data and thereby implement the conversion of the resolution. In the case where the resolution of the input image data is higher than the printing resolution, on the contrary, the process skips image data at a specified ratio to implement the conversion of the resolution. The process of converting the resolution is not essential in this embodiment, and the printing operation may be carried out without the conversion of the resolution.

The CPU 81 subsequently carries out a color correction process. The color correction process converts the image data consisting of the tone values of the respective color components R, G, and B into the tone data of the respective hues C, M, Y, and K used in the printer 22. A concrete procedure of the color correction process refers to the color correction table LUT (see FIG. 2), which stores a combination of C, M, Y, and K that enables the printer 22 to express a color represented by each combination of R, G, and B. Any one of the various known techniques is applicable to carry out the color correction with the color correction table LUT; for example, the interpolation technique as disclosed in JAPANESE PATENT LAID-OPEN GAZETTE No. 4-144481.

The CPU 81 then causes the color-corrected image data to be subjected to a multi-valuing process at steps S20 and S50. The multi-valuing process converts the tone values of the image data (in the range of 256 tones in this embodiment) into the tone values expressible for the respective pixels by the printer 22. The multi-valuing process of this embodiment carries out the conversion into four possible tones with respect to each ink, that is, 'creation of no dots', 'creation of a small dot', 'creation of a medium dot', and 'creation of a large dot'. As shown in FIG. 5, the printer 22 of this embodiment has two inks of different densities, that is, light ink and deep ink, for cyan and magenta. With respect to these hues, the multi-valuing process carries out the conversion into seven possible tones, that is, 'creation of a small dot', 'creation of a medium dot', and 'creation of a large dot' by deep ink, 'creation of a small dot', 'creation of a medium dot', and 'creation of a large dot' by light ink, and 'creation of no dots'.

For these hues, cyan and magenta, the program carries out a deep dot creation process, which is the multi-valuing process for the deep ink, at step S20 and subsequently carries out a light dot creation process, which is the multi-valuing process for the light ink, at step S50. Since only one ink is provided for the other hues, yellow and black, the program carries out only the deep dot creation process at step S20 and skips the light dot creation process of step S50. In order to clarify the processing flow, the flowchart of FIG. 8 shows only the case of the hues having two inks of different densities. When it is determined that the multi-valuing process is concluded for all the hues at step S80, the program exits from this dot creation routine. The multi-valued data are sorted out in the sequence of data to be printed by the printer 22 and then transferred to the printer 22.

The following describes the details of the multi-valuing process carried out in this embodiment. The concrete procedure is described in the case of the hues having two inks of different densities, that is, cyan and magenta. As mentioned previously, for these hues, the program determines the on-off conditions of six different types of dots and carries out the conversion into seven possible tones to implement the multi-valuing process. The six different types of dots include a large dot, a medium dot, and a small dot created with the deep ink (hereinafter referred to as the large deep dot, the medium deep dot, and the small deep dot in this sequence) as well as a large dot, a medium dot, and a small dot created with the light ink (hereinafter referred to as the large light dot, the medium light dot, and the small light dot in this sequence).

Figure 9:
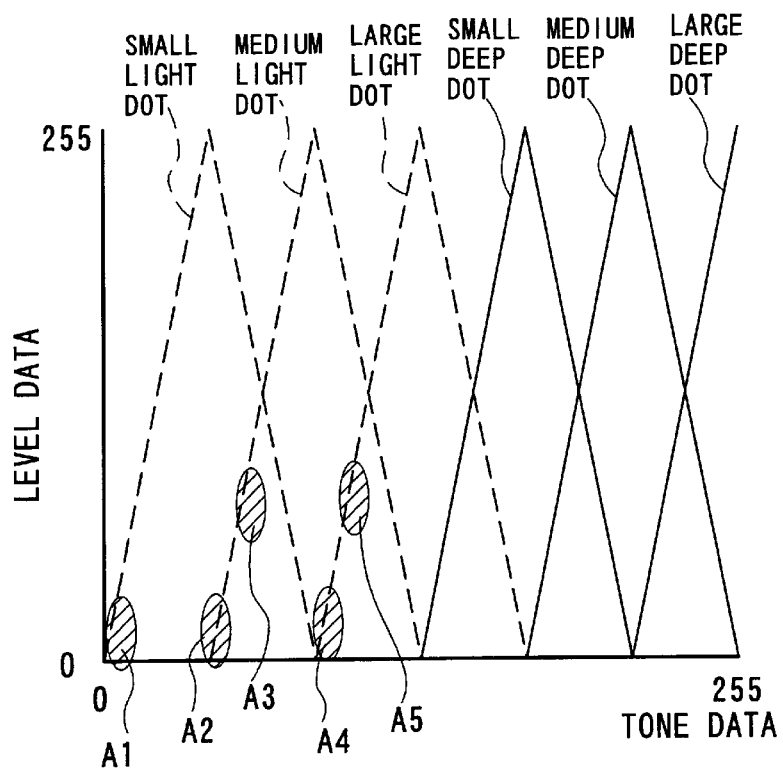
FIG. 9 is a table showing settings of recording ratios of the respective dots in the embodiment.

This embodiment carries out the multi-valuing process to record each type of dot at a preset recording ratio according to the tone data. FIG. 9 shows an example of the settings of the recording ratios applicable in this embodiment. The table of FIG. 9 gives the recording ratios of the six different types of dots, that is, the large deep dot, the medium deep dot, the small deep dot, the large light dot, the medium light dot, and the small light dot, corresponding to the tone data. This table is stored in the ROM 82 of the computer 90. The level data plotted as ordinate in FIG. 9 represent the recording ratios expressed as 8-bit data (=256 stages). The value 255 corresponds to the recording ratio of 100%. The tone data a plotted as abscissa in FIG. 9 represent the tone values of each hue obtained by the color correction process, which is carried out at step S14 in the flowchart of FIG. 8. A variety of settings other than those shown in FIG. 9 may be used for the recording ratios of the respective types of dots. The recording ratio of dots represents the ratio of dots created in a specified homogeneous tone area to all the pixels included in the specified area.

Figure 10:
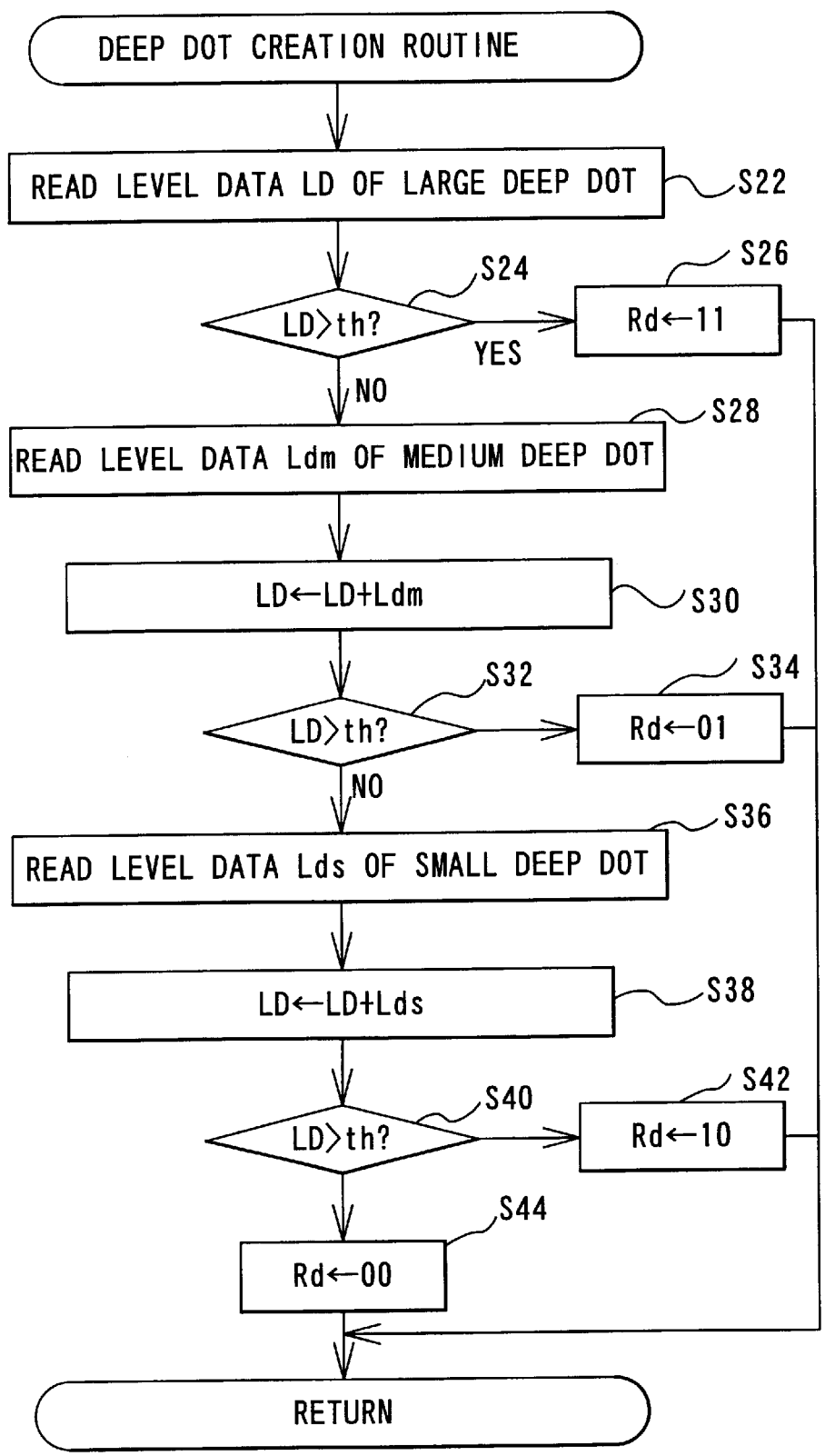
FIG. 10 is a flowchart showing the details of a deep dot creation process carried out at step S20 in the flowchart of FIG. 8.

FIG. 10 is a flowchart showing a routine of the deep dot creation process carried out at step S20 in the flowchart of FIG. 8. When the program enters the deep dot creation routine, the CPU 81 first reads level data LD of the large deep dot from the table of FIG. 9 at step S22. The CPU 81 then compares the level data LD with a threshold value th to determine the on-off state of the large deep dot at step S24. The known dither method is applied here for the determination for the on-off state of the dots.

Figure 11A:
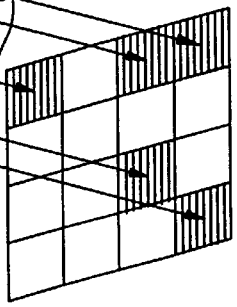
FIG. 11A and FIG. 11B show a process of determining the on-off state of the dot by a dither method.

A dither matrix is used to set different threshold values th to the respective pixels. FIG. 11A shows the principle of determining the on-off state of dots by the dither method.

For convenience of illustration, the dither matrix illustrated is only for part of the pixels. As shown in FIG. 11A, with respect to each pixel, the level data LD of the large dot is compared with the threshold value th stored at the corresponding position in the dither matrix. In the case where the level data LD is greater than the threshold value th in the dither matrix, a large dot is set in the on state. In the case where the level data LD is not greater than the threshold value, on the contrary, a large dot is set in the off state. The hatched pixels in FIG. 11A represent the pixels where the large dot is set in the on state.

This embodiment uses a large-scaled, blue noise mask-type dither matrix, in which the values 0 to 255 appear in the pixels of a 64×64 square. FIG. 12 shows example of the blue noise mask-type dither matrix. For convenience of illustration, only part of the dither matrix is shown. This dither matrix has the advantage of good dot dispersibility. Local concentration of dots makes the dots visually recognizable and thereby deteriorates the picture quality. The blue noise mask-type dither matrix having the good dot dispersibility enables the multi-valuing process with a relatively high picture quality. A variety of other dither matrixes are also applicable for the multi-valuing process.

In the case where the level data LD is greater than the threshold value th at step S24, the program determines that the large deep dot is set in the on state and substitutes the data '11', which is expressed in binary notation and represents creation of a large deep dot, into a resulting value Rd that represents the on-off state of the respective dots created by deep ink at step S26. The respective bits included in the resulting value Rd correspond to the on-off conditions of the driving waveforms W1 and W2 shown in FIG. 7. When the resulting value Rd=11 is transferred to the printer 22, both the driving waveforms W1 and W2 are in the on state to spout ink and create a large dot. In this case, the program skips the further determination for the on-off state of the medium deep dot and the on-off state of the small deep dot and exits from the deep dot creation routine.

In the case where the level data LD is not greater than the threshold value th at step S24, on the other hand, the program determines that the large deep dot is set in the off state and proceeds to the determination for the on-off state of the medium deep dot. The process of determining the on-off state of the medium deep dot is substantially identical with the process of determining the on-off state of the large deep dot. The CPU 81 refers to the table shown in FIG. 9 and reads level data Ldm for the medium deep dot at step S28 and adds the level data Ldm to the level data LD for the large deep dot to correct the level data LD at step S30. The CPU 81 then compares the corrected level data LD with the threshold value that step S32. The threshold value th is read from the same dither matrix as that used for the large deep dot. In the case where the corrected level data LD is greater than the threshold value th, the program determines that the medium deep dot is set in the on state and substitutes the binary number '01', which represents creation of a medium deep dot, into the resulting value Rd at step S34. When the resulting value Rd=01 is transferred to the printer 22, only the driving waveform W2 is set in the on state to create a medium dot. When it is determined that the medium deep dot is to be created, the program skips the determination for the on-off state of the small deep dot and exits from the deep dot creation routine.

Figure 11B:
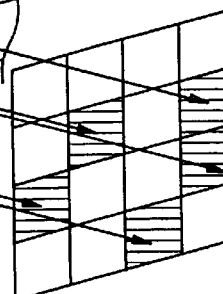

FIG. 11B shows the process of determining the on-off state of the medium deep dot in this embodiment. The bottom table in FIG. 11B gives the level data Ldm for the medium deep dot read from the table of FIG. 9. The procedure of this embodiment adds the level data Ldm for the medium deep dot to the level data LD for the large deep dot read previously to give the corrected level data LD. The corrected level data LD is shown in the top table of FIG. 11B. In the pixel where the corrected level data LD is greater than the threshold value th in the dither matrix, it is determined that the medium dot is set in the on state. The hatched pixels in FIG. 11B represent the pixels where the medium dot is set in the on state. Comparison between FIG. 11A and FIG. 11B shows that the medium deep dot is set in the on state in the pixels where no large deep dots are created.

The following gives the reason why the corrected level data LD is used to determine the on-off state of the medium deep dot. Among the settings of the recording ratios shown in the table of FIG. 9, an area where the tone data is close to 255 is selected as an extreme example. In this area, the level data for the medium deep dot is smaller than the level data for the large deep dot. Here it is assumed that the level data Ldm for the medium deep dot is used, instead of the corrected level data LD, to determine the on-off state of the dot. In this case, in the pixels where the large deep dot is set in the off state (that is, when the level data LD for the large deep dot is smaller than the threshold value th), since the level data Ldm for the medium deep dot is always smaller than the threshold value th, the medium deep dot is also set in the off state. This makes the recording ratio of the medium deep dot equal to 0% and does not effect the recording ratio of FIG. 9. In the area where the level data for the medium deep dot is greater than the level data for the large deep dot, the recording ratio of the medium deep dot becomes lower than the recording ratio set in the table of FIG. 9, because of the similar reason. The procedure of this embodiment determines the on-off state of the medium deep dot based on the sum of the level data Ldm for the medium deep dot and the level data LD for the large deep dot. This ensures the recording ratio of the medium deep dot set in the table of FIG. 9.

In the case where the corrected level data LD is not greater than the threshold value th at step S32, on the other hand, the program determines that the medium deep dot is set in the off state and proceeds to the determination for the on-off state of the small deep dot. The process of determining the on-off state of the small deep dot is substantially identical with the process of determining the on-off state of the other dots. The CPU 81 refers to the table shown in FIG. 9 and reads level data Lds for the small deep dot at step S36 and adds the level data Lds to the level data LD to correct the level data LD at step S38. Since the sum of the level data for the large deep dot and the level data for the medium deep dot has been stored in the level data LD, the sum of the level data for the large deep dot, the medium deep dot, and the small deep dot is set for the corrected level data LD. The CPU 81 then compares the corrected level data LD with the threshold value th at step S40. The corrected level data LD is used to determine the on-off state of the small deep dot, because of the reason discussed above for the medium deep dot. The determination for the on-off state of the small deep dot based on the corrected level data enables the small deep dot to be created at the recording ratio set in the table of FIG. 9, while preventing the small deep dot from being created in an overlapping manner in the pixel where the large deep dot or the medium deep dot already exists.

The threshold value th is read from the same dither matrix as that used for the large deep dot. In the case where the corrected level data LD is greater than the threshold value th, the program determines that the small deep dot is set in the on state and substitutes the binary number '10', which represents creation of a small deep dot, into the resulting value Rd at step S42. When the resulting value Rd=10 is transferred to the printer 22, only the driving waveform W1 is set in the on state to create a small dot. In the case where the corrected level data LD is not greater than the threshold value th, on the other hand, the program determines that the small deep dot is set in the off state and substitutes the binary number '00', which represents no creation of the deep dots, into the resulting value Rd at step S44. The CPU 81 then exits from the deep dot creation routine shown in the flowchart of FIG. 10.

Figure 13:
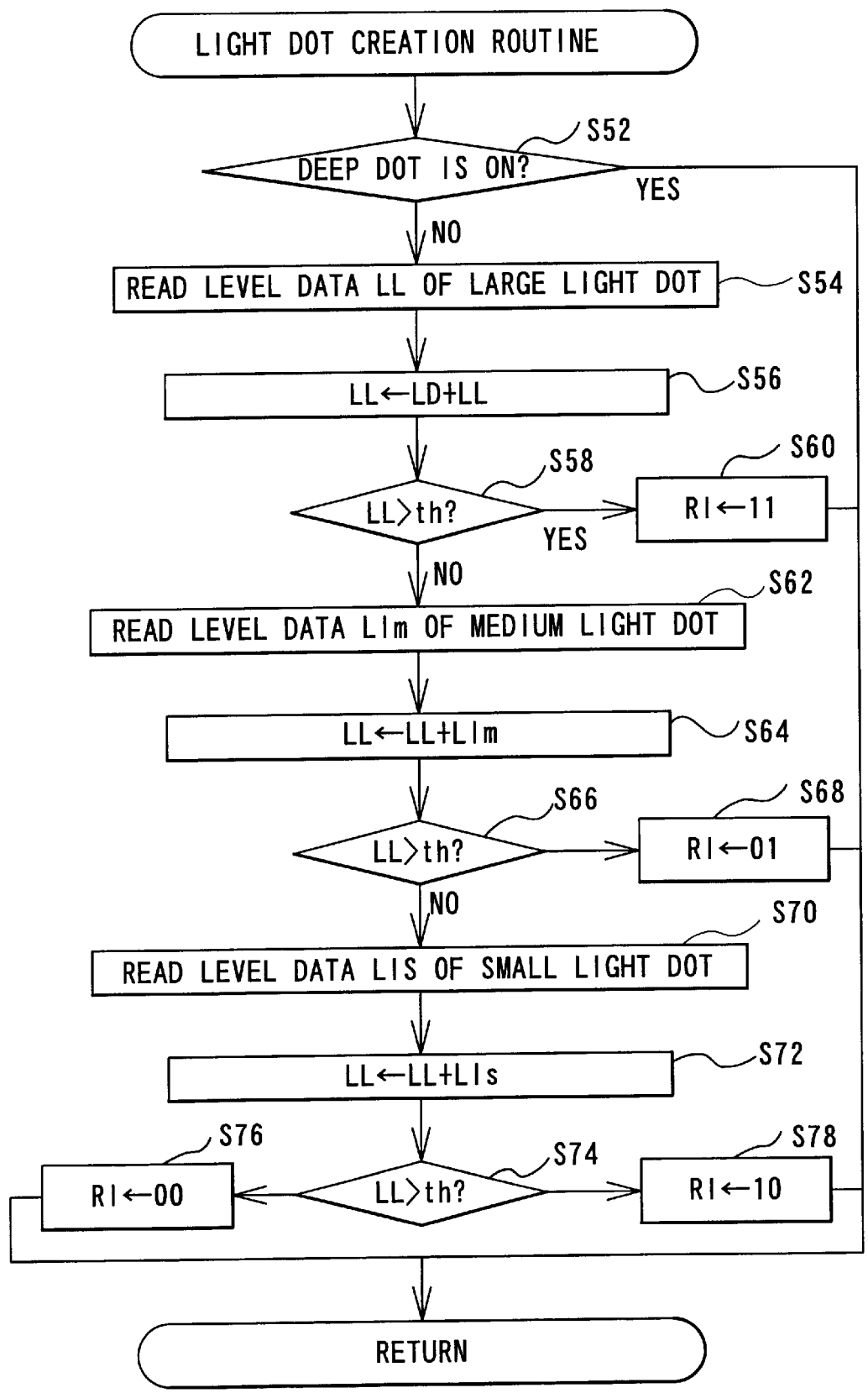
FIG. 13 is a flowchart showing the details of a light dot creation process carried out at step S50 in the flowchart of FIG. 8.

Referring back to the flowchart of FIG. 8, the CPU 81 carries out the light dot creation process at step S50. FIG. 13 is a flowchart showing a routine of the light dot creation process. When the program enters the light dot creation routine, the CPU 81 first determines whether or not any one of the deep dots is set in the on state at step S52. In the case where any one of the deep dots is set in the on state, the program does not carry out the determination for the on-off state of any light dot and directly exits from the light dot creation routine, in order to prevent the overlap of dots.

In the case where none of the deep dots is set in the on state, on the other hand, the program determines the on-off state of the light dot according to the dither method in the same manner as the determination for the on-off state of the deep dot. In accordance with a concrete procedure, the CPU 81 first reads level data LL of a large light dot at step S54. The level data LL is given from the table shown in FIG. 9. The CPU 81 then adds the value of the level data LD used in the deep dot creation routine to the level data LL to correct the level data LL at step S56. The sum of the level data of all the dots created by deep ink and the level data of the large light dot is accordingly stored in the corrected level data LL. The corrected level data LL is compared with a threshold value th at step S58. The threshold value th is read from the same dither matrix as that used in the deep dot creation routine.

This embodiment utilizes the corrected level data LL, which is obtained by adding the level data of all the dots created by deep ink, in order to determine the on-off state of the light dot. This arrangement effectively prevents the dot by light ink from being created in an overlapping manner in the pixel where the dot by deep ink already exists.

In the case where the corrected level data LL is greater than the threshold value th at step S58, the program determines that the large light dot is set in the on state and substitutes the data '11', which is expressed in binary notation and represents creation of a large light dot, into a resulting value Rl that represents the on-off state of the respective dots created by light ink at step S60. The meaning of the value substituted in the resulting value Rl is identical with that discussed for the resulting value Rd of the deep dots. When it is determined that the large light dot is to be created, the program skips the further determination for the on-off state of the medium light dot and the on-off state of the small light dot and exits from the light dot creation routine.

In the case where the corrected level data LL is not greater than the threshold value th at step S58, on the other hand, the program determines that the large light dot is set in the off state and proceeds to the determination for the on-off state of the medium light dot. The process of determining the on-off state of the medium light dot is substantially identical with the process of determining the on-off state of the other dots. In accordance with a concrete procedure, the CPU 81 refers to the table shown in FIG. 9 and reads level data Llm for the medium light dot at step S62 and adds the level data Llm to the level data LL to correct the level data LL at step S64. The sum of the level data of all the dots created by deep ink, the level data of the large light dot, and the level data of the medium light dot is accordingly stored in the corrected level data LL. The corrected level data LL is compared with the threshold value th at step S66. In the case where the corrected level data LL is greater than the threshold value th, the program determines that the medium light dot is set in the on state and substitutes the binary number '01', which represents creation of a medium light dot, into the resulting value Rl at step S68.

In the case where the corrected level data LL is not greater than the threshold value th at step S66, on the other hand, the program determines that the medium light dot is set in the off state and proceeds to the determination for the on-off state of the small light dot. In accordance with a concrete procedure, the CPU 81 reads level data Lls for the small light dot at step S70 and adds the level data Lls to the level data LL to correct the level data LL at step S72. The sum of the level data of all the dots created by deep ink and the level data of all the dots created by light ink is accordingly stored in the corrected level data LL. The corrected level data LL is compared with the threshold value th at step S74. In the case where the corrected level data LL is greater than the threshold value th, the program determines that the small light dot is set in the on state and substitutes the binary number '10', which represents creation of a small light dot, into the resulting value Rl at step S78.

In the case where the corrected level data LL is not greater than the threshold value at step S74, on the other hand, the program determines that the small light dot is set in the off state and substitutes the binary number '00', which represents no creation of the light dots, into the resulting value Rl at step S76. The CPU 81 then exits from the light dot creation routine shown in the flowchart of FIG. 13. The above procedure concludes the determination for the on-off state of all the dots created by deep ink and all the dots created by light ink, so as to implement the conversion into the seven possible tones. This processing is carried out for all the hues and all the pixels, in order to complete the final printing data FNL.

FIG. 14A through FIG. 14G show a process of dot creation by the method of this embodiment based on the tone values. For convenience of illustration, FIG. 14A through FIG. 14G show the process only for 4×4=16 pixels. A dither matrix shown in FIG. 14A is used to determine the on-off state of the respective dots. This matrix is a distributive matrix called Bayer's type.

FIG. 14B shows creation of dots in an area of relatively low tone data. Hatched circles in FIG. 14B represent dots. This corresponds to the state in which only the small light dot is created like an area A1 in the table of FIG. 9. The recording ratios of all the dots other than the small light dot are equal to zero. Based on the recording ratio of the small light dot, the small light dots are successively set in the on state in the sequence of the pixels having the smaller threshold values in the dither matrix of FIG. 14A. FIG. 14B shows the state in which the small light dots are set on in the pixels having the threshold value of not greater than 4.

FIG. 14C shows the state in a tone area where the recording ratio of the small light dot is equal to 100%. According to the settings in the table of FIG. 9, the recording ratios of all the other dots are equal to zero in this area. The small light dot is accordingly created in all the pixels as shown in FIG. 14C.

FIG. 14D shows the state in a tone area where the medium light dot starts creation. This corresponds to an area A2 shown in the table of FIG. 9. In this area, only the small light dot and the medium light dot are created. The total of the recording ratios of these small light dot and medium light dot is set equal to 100%. As described previously, the on-off state of the medium light dot is determined prior to the determination for the on-off state of the small light dot. Based on the recording ratio of the medium light dot, the medium light dots are successively set in the on state in the sequence of the pixels having the smaller threshold values in the dither matrix of FIG. 14A. FIG. 14D shows the state in which only one medium light dot is created in the pixel having the threshold value=1. The larger hatched circle having the greater diameter in FIG. 14D represents a medium light dot. The small light dot is created in the remaining pixels.

FIG. 14E shows the state having the greater tone values. This corresponds to an area A3 shown in the table of FIG. 9. In this area, only the small light dot and the medium light dot are created. As mentioned above, the medium light dots are successively set in the on state in the sequence of the pixels having the smaller threshold values in the dither matrix of FIG. 14A. FIG. 14E shows the state in which the medium light dot is created in the pixels having the threshold value of not greater than 4. The small light dot is created in the remaining pixels. The number of pixels where the medium light dot is created gradually increases in this manner in the sequence of the pixels having the smaller threshold values in the dither matrix. The recording ratio of the medium light dot eventually reaches 100% according to the settings of the recording ratios shown in the table of FIG. 9.

FIG. 14F shows the state in a tone area where the large light dot starts creation. This corresponds to an area A4 shown in the table of FIG. 9. In this area, only the medium light dot and the large light dot are created. The total of the recording ratios of these medium light dot and large light dot is set equal to 100%. As described previously, the on-off state of the large light dot is determined prior to the determination for the on-off state of the medium light dot. Based on the recording ratio of the large light dot, the large light dots are successively set in the on state in the sequence of the pixels having the smaller threshold values in the dither matrix of FIG. 14A. FIG. 14F shows the state in which only one large light dot is created in the pixel having the threshold value=1. The larger hatched circle having the greater diameter in FIG. 14F represents a large light dot. A different hatching pattern is applied for the large light dot to be distinguished from the medium light dot. The medium light dot is created in the remaining pixels.

FIG. 14G shows the state having the greater tone values. This corresponds to an area A5 shown in the table of FIG. 9. In this area, only the medium light dot and the large light dot are created. FIG. 14G shows the state in which the large light dot is created in the pixels having the threshold value of not greater than 4. The medium light dot is created in the remaining pixels. The number of pixels where the large light dot is created gradually increases in this manner in the sequence of the pixels having the smaller threshold values in the dither matrix.

FIG. 14 shows the process of dot creation with respect to the tone values that enable only the light dots to be created. The number of deep dots increases in a similar manner in the area where deep dots are created. Namely the deep dots are successively set in the on state in the sequence of the pixels having the smaller threshold values in the dither matrix. The process of FIG. 14 is only one example on the assumption of the recording ratios shown in the table of FIG. 9. According to the other settings of the recording ratios, for example, creation of the medium light dot may start before the recording ratio of the small light dot reaches 100%. It is also possible that the total recording ratio temporarily decreases with an increase in number of medium light dot. It is further possible that three or more different types of dots coexist. In any case, there is a tendency of creating the dot, which is subjected to the determination for the on-off state in preference to the other dots, in the pixels having the smaller threshold values in the dither matrix.

In the printing apparatus of the embodiment discussed above, the dither method is adopted in the determination for the on-off state of all the six different types of dots. This arrangement enables the extremely high-speed halftone processing. The on-off state of the dot that is a second or subsequent object for the determination is determined, based on the corrected recording ratio obtained by adding the recording ratio of the specific dot that is a first object for the determination. This structure effectively prevents the different types of dots from being created in the same pixel in an overlapping manner, while ensuring the recording ratios of the respective types of dots and implementing the halftone processing. The corrected value obtained by adding the recording ratios of the dots created by deep ink is used to determine the on-off state of the dots created by light ink. This structure readily prevents the dots by light ink from being created in an overlapping manner in the pixels where the dots by deep ink already exist.

The method of the embodiment determines the on-off state of the dots created by deep ink in the descending order of the ink weight and subsequently determines the on-off state of the dots created by light ink in the descending order of the ink weight. The dots created by deep ink are generally more conspicuous than the dots created by light ink. The structure of the embodiment determines the of-off state of the dots created by deep ink in preference to the dots created by light ink, thereby ensuring the high degree of freedom in the determination for the on-off state of the dots. This arrangement adequately ensures the dispersibility of the dots created by deep ink and thereby enables the printing of high picture quality. This effect is especially significant when the total of the recording ratios of the respective dots exceeds 100%.

(3) Second Embodiment

The following describes another printing apparatus as a second embodiment according to the present invention. The printing apparatus of the second embodiment has an identical hardware structure with that of the first embodiment shown in FIG. 1. The difference from the first embodiment is the light dot creation process executed at step S50 in the dot creation routine of FIG. 8. The deep dot creation process executed at step S20 in the second embodiment is the same as that executed in the first embodiment.

Figure 15:
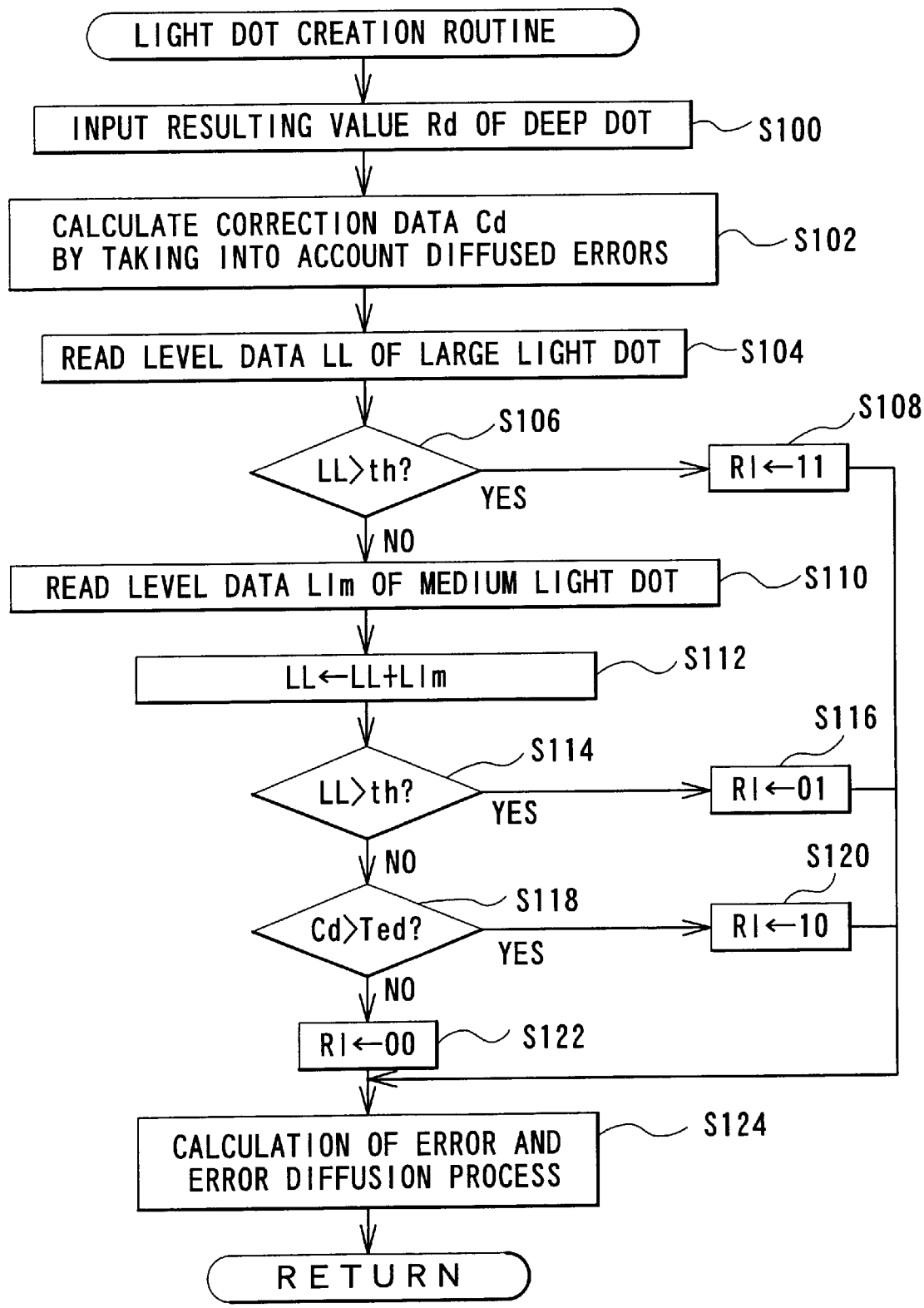
FIG. 15 is a flowchart showing another light dot creation routine executed in a second embodiment according to the present invention.

FIG. 15 is a flowchart showing a routine of the light dot creation process carried out in the second embodiment. When the program enters the light dot creation routine of FIG. 15, the CPU 81 first inputs the resulting value Rd, which represents the on-off state of the respective dots created by deep ink, at step S100, and then calculates correction data Cd, which is obtained by making the diffused errors reflect on the tone data, at step S102. These values are used in the subsequent processing.

The following describes the correction data Cd that reflects the diffused errors. The second embodiment determines the on-off state of the small light dot according to the error diffusion method as described later. The correction data Cd is used for the processing by the error diffusion method.

The error diffusion method diffuses a local density error occurring in a processed pixel, for which the on-off state of the dot has been determined, to peripheral unprocessed pixels in preset proportions. The on-off state of the dot is determined in a target pixel, which is currently subjected to the determination for the on-off state of the dot, after the errors diffused from the processed pixels are made to reflect on the tone data of the target pixel. The density error occurring as the result of the determination for the on-off state of the dot in the target pixel is subsequently diffused into peripheral unprocessed pixels. FIG. 18 shows proportions in which the error is diffused. The density error occurring in a target pixel PP is distributed to several following pixels in the scanning direction of the carriage and in the feeding direction of the printing paper in the preset proportions of FIG. 18. The processing of step S102 adds the diffused errors to the tone data and thereby obtains the correction data Cd, which is used in the determination for the on-off state of the dot by the error diffusion method. The concrete procedure of the determination for the on-off state of the dots by the error diffusion method will be described later.

The program proceeds to the determination for the on-off state of the respective dots created by the light ink. In accordance with a concrete procedure, the CPU 81 first reads the level data LL of the large light dot at step S104. The level data LL of the large light dot is read from the table shown in FIG. 9 in the same manner as the first embodiment. The level data LL is compared with the threshold value th at step S106. In the case where the level data LL is greater than the threshold value th, the program determines that the large light dot is set in the on state and substitutes the binary number '11', which represents creation of a large light dot, into the resulting value R1 that represents the on-off state of the respective dots created by light ink at step S108. The meaning of the value substituted in the resulting value Rl is identical with the meaning discussed in the first embodiment.

The light dot creation routine of the second embodiment does not add the level data LD of the deep dots to the level data of the large light dot LL (see step S56 in the flowchart of FIG. 13). The second embodiment uses a dither matrix, which is different from the dither matrix used in the determination for the on-off state of the deep dots, to determine the on-off state of the light dots. The use of the different dither matrixes effectively prevents the light dots from being created in an overlapping manner in the pixels where the deep dots already exist, without the step of adding the level data LD of the deep dots.

FIG. 16 shows an example of the dither matrixes used in the second embodiment. For convenience of illustration, dither matrixes of 4×4=16 pixels are given as an example. The method of the second embodiment generates a dither matrix UM used in the determination for the on-off state of the light dots, based on a dither matrix TM used in the determination for the on-off state of the deep dots. As shown in FIG. 16, the dither matrix UM is obtained by inverting the respective elements included in the basic dither matrix TM in the vertical direction. For example, the threshold value '1'located at the upper left corner in the basic dither matrix TM is located at the lower left corner in the dither matrix UM. The structure of the embodiment provides a new dither matrix by changing the positions of the elements included in the basic dither matrix.

The actual procedure of the light dot creation routine in the second embodiment maps the target pixels to be processed to the dither matrix according to a different relationship from that in the deep dot creation routine, in order to exert the same effects as those in the case of generating the new dither matrix UM. It is here assumed that the coordinate values of the pixels increase as y=0, 1, 2, 3, . . . in the feeding direction of the printing paper. The elements of the dither matrix TM shown in FIG. 16 in the feeding direction of the printing paper are shown as My=0, 1, 2, 3. The pixels are mapped to the dither matrix TM in the normal orientation in the case of the determination for the on-off state of the deep dots. The relationship between the coordinate value y of the pixel and the element My in the dither matrix TM in the feeding direction of the printing paper is expressed as My=y %4, where % denotes a remainder operator. This relationship enables, for example, the threshold value expressed by the element of My=0 to be mapped to the pixels y=0, 4, 8, . . . .

The pixels are mapped to the dither matrix TM in the inverted orientation in the feeding direction of the printing paper, on the other hand, in the case of the determination for the on-off state of the light dots. In this case, the relationship between the coordinate value y of the pixel and the element My in the dither matrix TM in the feeding direction of the printing paper is expressed as My=3−y %4. This relationship enables mapping given below:

Threshold value expressed by the element of My=3 mapped to the pixels y=0,4,8, . . . .

Threshold value expressed by the element of My=2 mapped to the pixels y=1,5,9, . . . .

Threshold value expressed by the element of My=1 mapped to the pixels y=2,6,10, . . . .

Threshold value expressed by the element of My=0 mapped to the pixels y=3,7,11, . . . .

This results in the same mapping as that based on the dither matrix UM. This embodiment uses the basic dither matrix TM according to the different relationships of the pixels, thereby saving the required capacity of the memory for storing the dither matrixes.

FIG. 17 shows the states of dot creation according to the basic dither matrix. The closed circles in FIG. 17 denote deep dots, whereas the hatched circles denote light dots. FIG. 17A shows the state in which only one deep dot and one light dot are created. Since the dither matrix TM is used to determine the on-off state of the deep dot, the deep dot is created in the pixel at the upper left corner having the smallest threshold value. The dither matrix UM is used, on the other hand, to determine the on-off state of the light dot, so that the light dot is created in the pixel at the lower left corner having the smallest threshold value.

FIG. 17B shows the state in which both the deep dot and the light dot are created at the recording ratio of 50%. The deep dots are set in the on state in the sequence of the pixels having the smaller threshold values in the dither matrix TM, whereas the light dots are set in the on state in the sequence of the pixels having the smaller threshold values in the dither matrix UM. The use of the different dither matrixes having the different arrangements effectively prevent the deep dot and the light dot from being created in the same pixel in the overlapping manner.

Referring back to the light dot creation routine shown in the flowchart of FIG. 15, when the level data LL of the large light dot is not greater than the threshold value th at step S106, the program determines that the large light dot is set in the off state and proceeds to the determination for the on-off state of the medium light dot. In accordance with a concrete procedure, the CPU 81 reads the level data Llm of the medium light dot from the table shown in FIG. 9 at step S110 and adds the level data Llm to the level data LL to correct the level data LL at step S112. The sum of the level data for the large light dot and the level data for the medium light dot is accordingly stored in the corrected level data LL. The level data LL is compared with the threshold value th at step S114. The threshold value th is read from the same dither matrix as that used for the large light dot, that is, from the dither matrix UM shown in FIG. 16.

In the case where the level data LL is greater than the threshold value th, the program determines that the medium light dot is set in the on state and substitutes the binary number '01', which represents creation of a medium light dot, into the resulting value Rl at step S116. When it is determined that the medium light dot is to be created, the program skips the further determination for the on-off state of the small light dot.

In the case where the level data LL is not greater than the threshold value th at step S114, on the other hand, the program proceeds to the determination for the on-off state of the small light dot. The second embodiment determines the on-off state of the small light dot according to the error diffusion method. The correction data Cd calculated at step S102 is used in the determination for the on-off state of the dot. In accordance with a concrete procedure, the CPU 81 compares the correction data Cd with a threshold value Ted at step S118. The threshold value Ted here is a preset constant value. Any value may be set to the threshold value Ted. In this embodiment, a density evaluation value of the small light dot is set to the threshold value Ted. In the case where the correction data Cd is greater than the threshold value Ted, the program determines that the small light dot is set in the on state and substitutes the binary number '10', which represents creation of a small light dot, into the resulting value Rl at step S120. In the case where the correction data Cd is not greater than the threshold value Ted, on the other hand, the program determines that the small light dot is set in the off state and substitutes the binary number '00', which represents no creation of the light dots, into the resulting value Rl at step S122.

The above processing specifies the resulting value Rd that represents the on-off state of the deep dots and the resulting value Rl that represents the on-off state of the light dots. Namely the method carries out the 7-valuing process with respect to a target pixel PP, which is an object to be processed. The CPU 81 subsequently carries out calculation of an error ERR from the resulting values Rd and Rl and performs the error diffusion process at step S124. The error ERR here denotes a difference between the density expressed when a certain dot is created in the target pixel PP according to the result of the multi-valuing process and the density to be expressed according to the correction data Cd. The density expressed when a certain dot is created in the target pixel PP is determined according to a density evaluation value RV, which has been set in advance for each dot.

The error ERR is obtained from the correction data Cd and the density evaluation value RV according to the equation of ERR=Cd−RV. By way of example, it is assumed that a large deep dot is created in a pixel having the correction data Cd equal to 199, when the density evaluation value RV of the large deep dot corresponds to the tone value '255'. In this case, there is a density error given as 199−256=−56. This means that the expressed density is too high.

The error diffusion process diffuses the error thus obtained into peripheral pixels in the vicinity of the currently processed target pixel PP with predetermined weights. FIG. 18 shows an example of the weights used in this embodiment. Since the error should be distributed only to unprocessed pixels, the process diffuses the error into the pixels located after the target pixel in the scanning direction of the carriage or in the feeding direction of the printing paper as shown in FIG. 18. When the error is equal to −56, the value −14, which corresponds to one quarter of the error −56, is distributed to a pixel Pl adjacent to the currently processed target pixel PP. The diffused error is considered in the calculation at step S102 when the pixel P1 is set to the target pixel. For example, when the pixel P1 has the tone value equal to 214, addition of the distributed error −14 gives the calculated correction data Cd equal to 200. Repeatedly executing this process implements the halftone processing to attain the minimum local density error.

The printing apparatus of the second embodiment enables the high-speed printing with an extremely high picture quality. When the on-off state of the dot is determined by the dither method, a relatively large local error may occur as the difference between the density expressed according to the result of the determination and the density to be expressed according to the tone data. In the printing apparatus of the second embodiment, the on-off state of the small light dot is determined according to the error diffusion method by taking into account the density errors arising due to the on-off state of the other dots. This arrangement effectively reduces the local density error and enables the printing of high picture quality. The printing apparatus of the second embodiment applies the time-consuming error diffusion method only to the small light dot, while adopting the dither method in the determination for the on-off state of the other dots. This structure of the second embodiment thus does not significantly increase the processing time.

In the method of the second embodiment, the deep dot creation routine (FIG. 10) and the light dot creation routine (FIG. 15) use the dither matrixes including the elements of different arrangements. Like the first embodiment, in each of the dot creation routines of the second embodiment, the on-off state of the dot is determined after the level data of the currently processed dot is corrected with the level data of all the dots previously subjected to the determination for the on-off state. Such processing effectively prevents the different types of dots, which are subjected to the determination for the on-off state by the dither method, from being created in the same pixel in an overlapping manner. Like the first embodiment, the structure of the second embodiment may use the same dither matrix for both the dot creation routines. In this case, the on-off state of the light dots is determined by making the recording ratios of the deep dots reflect on the recording ratios of the light dots.

Figure 19:
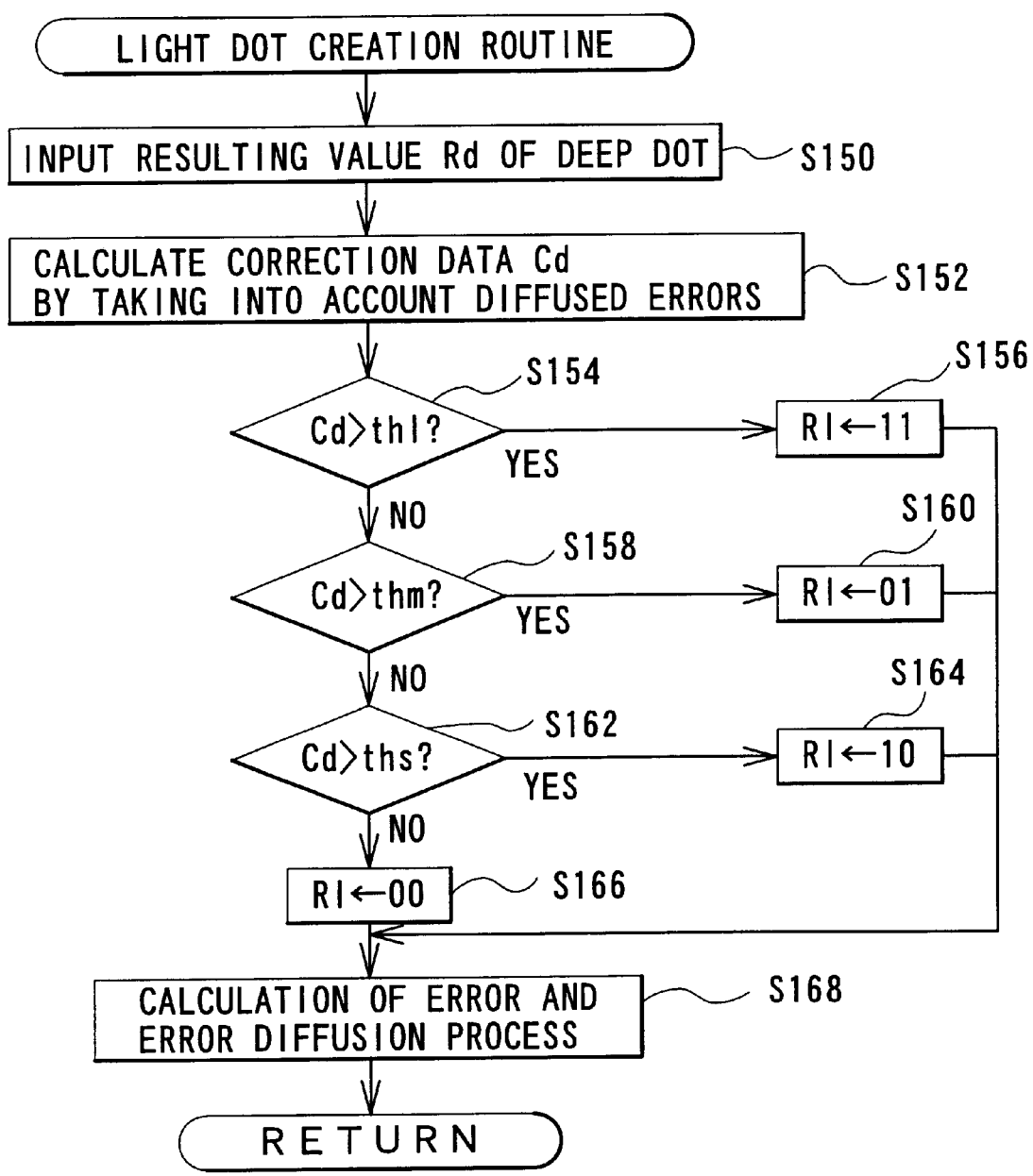
FIG. 19 is a flowchart showing still another light dot creation routine as a modification of the second embodiment.

In the second embodiment, the error diffusion method is applied only to the small light dot. The error diffusion method may, however, be applicable to a plurality of dots having the lower density evaluation values. The flowchart of FIG. 19 shows an exemplified processing routine where the on-off state of all the light dots is determined by the error diffusion method.

When the program enters this routine, the CPU 81 first inputs the resulting value Rd that specifies the on-off state of the dots created by the deep ink at step S150, and calculates the correction data Cd, which is obtained by making the diffused errors on the tone data, at step S152. The processing of these steps is identical with that of the second embodiment shown in the flowchart of FIG. 15.

The CPU 81 subsequently compares the correction data Cd with a first threshold value th1 at step S154. In the case where the correction data Cd is greater than the first threshold value th1, the program specifies creation of the large light dot at step S156. Any value that can be used as the reference value for determining creation or non-creation of the large light dot may be set to the first threshold value thl. In this example, an intermediate value between the density evaluation value of the large light dot and the density evaluation value of the medium light dot is set to the first threshold value thl.

When it is determined that the large light dot is in the off state, the CPU 81 compares the correction data Cd with a second threshold value thm at step S158. In the case where the correction data Cd is greater than the second threshold value thm, the program specifies creation of the medium light dot at step S160. Any value that can be used as the reference value for determining creation or non-creation of the medium light dot may be set to the second threshold value thm. In this example, an intermediate value between the density evaluation value of the medium light dot and the density evaluation value of the small light dot is set to the second threshold value thm. When it is determined that the medium light dot is in the off state, the CPU 81 compares the correction data Cd with a third threshold value ths at step S162. In the case where the correction data Cd is greater than the third threshold value ths, the program specifies creation of the small light dot at step S164. When the correction data Cd is not greater than the third threshold value ths, on the other hand, the program specifies no creation of dots at step S166.

After the determination for the on-off state of the dots in one pixel, the CPU 81 carries out the calculation of the density error and the error diffusion process based on the results of determination at step S168. The processing of step S168 is identical with that of the second embodiment shown in the flowchart of FIG. 15. As shown in the modified example, the error diffusion method may be applied to the determination for the on-off state of all the large, medium, and small dots created by the light ink in the light dot creation routine. There are a variety of other possible combinations of the dots processed by the error diffusion method and the dots processed by the dither method.

All the above embodiments regard the case that use two inks of different densities, that is, the deep ink and the light ink, and create dots in three different ink weights, that is, the large dot, the medium dot, and the small dot. The principle of the present invention is, however, not restricted to this arrangement, and the ink densities and ink weights may be varied arbitrarily.

All the above embodiments regard the ink jet printer 22 having the piezoelectric elements. The principle of the present invention is also applicable to a variety of other printers, for example, a printer that supplies electricity to a heater disposed in an array of nozzles and spouts ink with bubbles produced in the ink. The present invention is also applicable to a variety of printing apparatuses other than the printers as long as the printing apparatus allocates dots to the respective pixels to express an image.

Another application of the present invention is a recording medium, in which a program for actualizing the computer-implemented processing discussed above is recorded. Available examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media. Still another application of the invention is a program supply apparatus that supplies a computer program, which causes the computer to carry out the image processing and other processing operations, to the computer via a communications path.

The present invention is not restricted to the above embodiments or their modifications, but there may be many other modifications, changes, and alterations without departing from the scope or spirit of the main characteristics of the present invention. For example, part or all of the various control processes discussed above may be actualized by the hardware structure, instead of the software programs.

It should be clearly understood that the above embodiments are only illustrative and not restrictive in any sense. The scope and spirit of the present invention are limited only by the terms of the appended claims.

What is claimed is:

1. A method of printing a multi-tone image as a distribution of dots created with a head, said head handling at least two different inks that have an identical hue but different densities and creating at least three different types of dots, which include at least two different types of dots that have different ink weights and are created by at least one ink among the at least two different inks, to be created on a printing medium, said method comprising the steps of:
   (a) inputting tone data of an image to be printed;
   (b) successively determining on-off state of the at least three different types of dots with respect to each pixel in a preset sequence, the preset sequence comprising a specific order of ink weight in which the at least two different types of dots created by the identical ink are consecutively subjected to the determination for the on-off state; and
   (c) driving said head based on results of the determination carried out in said step (b), so as to create the respective types of dots,
   wherein said step (b) comprises the steps of:
      (b1) setting a recording ratio regarding each of the at least three different types of dots, based on the tone data;
      (b2) comparing the recording ratio set in said step (b1) for a specific dot, which is a first object of the determination, with a threshold value read from a dither matrix that has been provided in advance and determining on-off state of the specific dot based on a result of the comparison; and
      (b3) comparing a corrected recording ratio with the threshold value and determining on-off state of another dot, which is a second or subsequent object of the determination, based on a result of the comparison with respect to pixels in which all the dots previously subjected to the determination for the on-off state are set in the off state, said corrected recording ratio being obtained by correcting the recording ratio set in said step (b1) for the another dot with the recording ratios of all the dots previously subjected to the determination for the on-off state.

2. A method in accordance with claim 1, wherein said step (b) successively determines the on-off state of the at least three different types of dots in a descending order of ink density.

3. A method in accordance with claim 1, wherein said head enables creation of at least four different types of dots, which include dots formed in at least two different ink weights respectively by a deep ink having a higher ink density and a light ink having a lower ink density, and
   wherein said step (b) first determines the on-off state of the dots created by the deep ink in a descending order of ink weight and subsequently determines the on-off state of the dots created by the light ink in a descending order of ink weight.

4. A method of printing a multi-tone image as a distribution of dots created with a head, said head handling at least two different inks that have an identical hue but different densities and creating at least three different types of dots, which include at least two different types of dots that have different ink weights and are created by at least one identical ink among the at least two different inks, to be created on a printing medium, said method comprising the steps of:

(a) inputting tone data of an image to be printed;

(b) dividing the at least three different types of dots according to a preset classification into a first group including a plurality of different types of dots having higher density evaluation values and a second group including at least one type of dot having a lower density evaluation value;

(c) successively determining on-off state of the plurality of different types of dots in said first group with respect to each pixel in a preset sequence, the preset sequence comprising a specific order of ink weight in which the at least two different types of dots created by the identical ink are consecutively subjected to the determination for the on-off state;

(d) determining on-off state of the at least one type of dot in said second group by an error diffusion method based on correction data, the correction data being obtained by correcting the tone data with density errors occurring due to the on-off state of the plurality of dots in said first group; and (e) driving said head based on results of the determinations carried out in said step (c) and said step (d), so as to create the respective types of dots, wherein said step (c) comprises the steps of:

(c1) setting a recording ratio regarding each of the plurality of different types of dots in said first group, based on the tone data;

(c2) comparing the recording ratio set in said step (c1) for a specific dot, which is a first object of the determination, with a threshold value read from a dither matrix that has been provided in advance and determining on-off state of the specific dot based on a result of the comparison; and (c3) comparing a corrected recording ratio with the threshold value and determining on-off state of another dot, which is a second or subsequent object of the determination, based on a result of the comparison with respect to pixels in which all the dots previously subjected to the determination for the on-off state are set in the off state, said corrected recording ratio being obtained by correcting the recording ratio set in said step (c1) for the another dot with the recording ratios of all the dots previously subjected to the determination for the on-off state.

5. A method in accordance with claim 4, wherein the at least one type of dot in said second group is a dot having a lowest density evaluation value among the at least three different types of dots created with said head.

6. A method in accordance with claim 4, wherein said step (c) carries out the determination for the on-off state of the respective dots with a single dither matrix, whether or not the respective dots are created by the identical ink.

7. A method in accordance with claim 4, wherein said step (c) further comprises the step of:

(c0) providing a new dither matrix, which includes threshold values in a different arrangement specified for each of the at least two different inks, from a dither matrix stored in advance, and wherein said step (c) performs said step (c2) and said step (c3) to carry out the determination for the on-off state with the dither matrix corresponding to each of the at least two different inks, with respect to each dot created by the ink.

8. A method in accordance with claim 4, wherein said head enables creation of at least four different types of dots, which include dots formed in at least two different ink weights respectively by a deep ink having a higher ink density and a light ink having a lower ink density, the at least one type of dot having the lower density evaluation value is a dot that has a lowest density evaluation value and is created by the light ink, and wherein said step (c) excludes the dot that has the lowest density evaluation value and is created by the light ink, first determines the on-off state of the dots created by the deep ink in a descending order of ink weight, and subsequently determines the on-off state of the dots created by the light ink in a descending order of ink weight.

9. A printing apparatus that enables a multi-tone image to be printed as a distribution of dots created with a head, said head handling at least two different inks that have an identical hue but different densities and creating at least three different types of dots, which include at least two different types of dots that have different ink weights and are created by at least one ink among the at least two different inks, to be created on a printing medium, said printing apparatus comprising:

an input unit that inputs tone data of an image to be printed;

a dither determination unit that successively determines on-off state of the at least three different types of dots with respect to each pixel in a preset sequence, the preset sequence comprising a specific order of ink weight in which the at least two different types of dots created by the identical ink are consecutively subjected to the determination for the on-off state; and a dot creation unit that drives said head based on results of the determination carried out by said dither determination unit, so as to create the respective types of dots, wherein said dither determination unit comprises:

a memory unit in which a relationship between tone data and a recording ratio regarding each of the at least three different types of dots is stored;

a setting unit that refers to said memory unit and sets the recording ratio of each of the at least three different types of dots corresponding to the input tone data; and a dot creation determination unit that compares a corrected recording ratio of a target dot with a threshold value stored in a dither matrix that has been provided in advance, said corrected recording ratio being obtained by correcting the recording ratio of the target dot set by said setting unit with the recording ratios of all the dots previously subjected to the determination for the on-off state, said dot creation determination unit then determining on-off state of the target dot with respect to pixels in which all the dots previously subjected to the determination for the on-off state are set in the off state, based on a result of the comparison.

10. A printing apparatus in accordance with claim 9, wherein said dither determination unit successively determines the on-off state of the at least three different types of dots in a descending order of ink density.

11. A printing apparatus in accordance with claim 9, wherein said head enables creation of at least four different types of dots, which include dots formed in at least two different ink weights respectively by a deep ink having a higher ink density and a light ink having a lower ink density, and wherein said dither determination unit first determines the on-off state of the dots created by the deep ink in a descending order of ink weight and subsequently determines the on-off state of the dots created by the light ink in a descending order of ink weight.

12. A printing apparatus that enables a multi-tone image to be printed as a distribution of dots created with a head, said head handling at least two different inks that have an identical hue but different densities and creating at least three different types of dots, which include at least two different types of dots that have different ink weights and are created by at least one ink among the at least two different inks, to be created on a printing medium, said printing apparatus comprising:

a storage unit that stores divisions, which are obtained by dividing the at least three different types of dots according to a preset classification into a plurality of different types of dots having higher density evaluation values and at least one type of dot having a lower density evaluation value;

an input unit that inputs tone data of an image to be printed;

a dither determination unit that successively determines on-off state of the plurality of different types of dots having the higher density evaluation values with respect to each pixel in a preset sequence, the preset sequence comprising a specific order of ink weight in which the at least two different types of dots created by the identical ink are consecutively subjected to the determination for the on-off state;

an error diffusion determination unit that determines on-off state of the at least one type of dot having the lower density evaluation value by an error diffusion method based on correction data, the correction data being obtained by correcting the tone data with density errors occurring due to the on-off state of the plurality of dots having the higher density evaluation values; and a dot creation unit that drives said head based on results of the determinations carried out by said dither determination unit and said error diffusion determination unit, so as to create the respective types of dots, wherein said dither determination unit comprises:

a memory unit in which a relationship between tone data and a recording ratio regarding each of the plurality of different types of dots having the higher density evaluation values is stored;

a setting unit that refers to said memory unit and sets the recording ratio of each of the plurality of different types of dots having the higher density evaluation values corresponding to the input tone data; and a dot creation determination unit that compares a corrected recording ratio of a target dot with a threshold value stored in a dither matrix that has been provided in advance, said corrected recording ratio being obtained by correcting the recording ratio of the target dot set by said setting unit with the recording ratios of all the dots previously subjected to the determination for the on-off state, said dot creation determination unit then determining on-off state of the target dot with respect to pixels in which all the dots previously subjected to the determination for the on-off state are set in the off state, based on a result of the comparison.

13. A printing apparatus in accordance with claim 12, wherein the at least one type of dot having the lower density evaluation value is a dot having a lowest density evaluation value among the at least three different types of dots created with said head.

14. A printing apparatus in accordance with claim 12, wherein said dither determination unit carries out the determination for the on-off state of the respective dots with a single dither matrix, whether or not the respective dots are created by the identical ink.

15. A printing apparatus in accordance with claim 12, wherein said dither determination unit further comprises:

a dither matrix generation unit that provides a new dither matrix, which includes threshold values in a different arrangement specified for each of the at least two different inks, from a dither matrix stored in advance; and a decision unit that carries out the determination for the on-off state with the dither matrix corresponding to each of the at least two different inks, with respect to each dot created by the ink.

16. A printing apparatus in accordance with claim 12, wherein said head enables creation of at least four different types of dots, which include dots formed in at least two different ink weights respectively by a deep ink having a higher ink density and a light ink having a lower ink density, the at least one type of dot having the lower density evaluation value is a dot that has a lowest density evaluation value and is created by the light ink, and wherein said dither determination unit excludes the dot that has the lowest density evaluation value and is created by the light ink, first determines the on-off state of the dots created by the deep ink in a descending order of ink weight, and subsequently determines the on-off state of the dots created by the light ink in a descending order of ink weight.

17. A recording medium in which a program for enabling a multi-tone image to be printed by a printing apparatus is recorded in a computer readable manner, said printing apparatus comprising at least two different inks that have an identical hue but different densities and creating at least three different types of dots, which include at least two different types of dots that have different ink weights and are created by at least one ink among the at least two different inks, to be created on a printing medium, said program comprising:

a program code that causes a computer to successively determine on-off state of the at least three different types of dots with respect to each pixel in a preset sequence, the preset sequence comprising a specific order of ink weight in which the at least two different types of dots created by the identical ink are consecutively subjected to the determination for the on-off state, said program code causing the computer to actualize the functions of:

setting a recording ratio regarding each of the at least three different types of dots, based on tone data of an original image;

comparing the recording ratio of a specific dot, which is a first object of the determination, with a threshold value read from a dither matrix that has been provided in advance and determining on-off state of the specific dot based on a result of the comparison; and comparing a corrected recording ratio with the threshold value and determining on-off state of another dot, which is a second or subsequent object of the determination, based on a result of the comparison with respect to pixels in which all the dots previously subjected to the determination for the on-off state are set in the off state, said corrected recording ratio being obtained by correcting the recording ratio of the another dot with the recording ratios of all the dots previously subjected to the determination for the on-off state.

18. A recording medium in accordance with claim 17, wherein said program code causes the computer to successively determine the on-off state of the at least three different types of dots in a descending order of ink density.

19. A recording medium in accordance with claim 17, wherein said printing apparatus enables creation of at least four different types of dots, which include dots formed in at least two different ink weights respectively by a deep ink having a higher ink density and a light ink having a lower ink density, and wherein said program code causes the computer to first determine the on-off state of the dots created by the deep ink in a descending order of ink weight and subsequently determine the on-off state of the dots created by the light ink in a descending order of ink weight.

20. A recording medium in which a program for enabling a multi-tone image to be printed by a printing apparatus is recorded in a computer readable manner, said printing apparatus comprising at least two different inks that have an identical hue but different densities and creating at least three different types of dots, which include at least two different types of dots that have different ink weights and are created by at least one ink among the at least two different inks, to be created on a printing medium, said program comprising:
a first program code that causes a computer to divide the at least three different types of dots according to a preset classification into a plurality of different types of dots having higher density evaluation values and at least one type of dot having a lower density evaluation value;
a second program code that causes the computer to successively determine on-off state of the plurality of different types of dots having the higher density evaluation values with respect to each pixel in a preset sequence, the preset sequence comprising a specific order of ink weight in which the at least two different types of dots created by the identical ink are consecutively subjected to the determination for the on-off state; and
a third program code that causes the computer to determine on-off state of the at least one type of dot having the lower density evaluation value by an error diffusion method based on correction data, the correction data being obtained by correcting the tone data with density errors occurring due to the on-off state of the plurality of dots having the higher density evaluation values,
said second program code causing the computer to actualize the functions of:

setting a recording ratio regarding each of the plurality of different types of dots having the higher density evaluation values, based on tone data of an original image;
comparing the recording ratio of a specific dot, which is a first object of the determination, with a threshold value read from a dither matrix that has been provided in advance and determining on-off state of the specific dot based on a result of the comparison; and
comparing a corrected recording ratio with the threshold value and determining on-off state of another dot, which is a second or subsequent object of the determination, based on a result of the comparison with respect to pixels in which all the dots previously subjected to the determination for the on-off state are set in the off state, said corrected recording ratio being obtained by correcting the recording ratio of the another dot with the recording ratios of all the dots previously subjected to the determination for the on-off state.

21. A recording medium in accordance with claim 20, wherein the at least one type of dot having the lower density evaluation value is a dot having a lowest density evaluation value among the at least three different types of dots created by said printing apparatus.

22. A recording medium in accordance with claim 20, wherein said second program code causes the computer to carry out the determination for the on-off state of the respective dots with a single dither matrix, whether or not the respective dots are created by the identical ink.

23. A recording medium in accordance with claim 20, wherein said second program code further causes the computer to actualize the functions of:

providing a new dither matrix, which includes threshold values in a different arrangement specified for each of the at least two different inks, from a dither matrix stored in advance; and
carrying out the determination for the on-off state with the dither matrix corresponding to each of the at least two different inks, with respect to each dot created by the ink.

24. A recording medium in accordance with claim 20, wherein said printing apparatus enables creation of at least four different types of dots, which include dots formed in at least two different ink weights respectively by a deep ink having a higher ink density and a light ink having a lower ink density, the at least one type of dot having the lower density evaluation value is a dot that has a lowest density evaluation value and is created by the light ink, and
wherein said second program code causes the computer to exclude the dot that has the lowest density evaluation value and is created by the light ink, first determine the on-off state of the dots created by the deep ink in a descending order of ink weight, and subsequently determine the on-off state of the dots created by the light ink in a descending order of ink weight.

* * * * *